United States Patent
Kim et al.

(10) Patent No.: US 10,325,688 B2
(45) Date of Patent: Jun. 18, 2019

(54) PASSIVE HEAT REMOVAL SYSTEM FOR NUCLEAR POWER PLANT

(71) Applicant: KOREA ATOMIC ENERGY RESEARCH INSTITUTE, Daejeon (KR)

(72) Inventors: Young In Kim, Daejeon (KR); Keung Koo Kim, Daejeon (KR); Ju Hyeon Yoon, Daejeon (KR); Jae Joo Ha, Daejeon (KR); Tae Wan Kim, Daejeon (KR); Cheon Tae Park, Daejeon (KR); Seung Yeob Ryu, Daejeon (KR); Han Ok Kang, Daejeon (KR); Young Min Bae, Daejeon (KR); Joo Hyung Moon, Daejeon (KR); Hun Sik Han, Daejeon (KR); Kyung Jun Kang, Daejeon (KR); Soo Jai Shin, Daejeon (KR); Seo Yoon Jung, Daejeon (KR); Young Soo Kim, Seoul (KR)

(73) Assignee: KOREA ATOMIC ENERGY RESEARCH INSTITUTE, Daejeon (KR)

( * ) Notice: Subject to any disclaimer, the term of this patent is extended or adjusted under 35 U.S.C. 154(b) by 125 days.

(21) Appl. No.: 15/327,355

(22) PCT Filed: Jul. 22, 2015

(86) PCT No.: PCT/KR2015/007635
§ 371 (c)(1),
(2) Date: Jan. 18, 2017

(87) PCT Pub. No.: WO2016/013874
PCT Pub. Date: Jan. 28, 2016

(65) Prior Publication Data
US 2017/0148533 A1 May 25, 2017

(30) Foreign Application Priority Data

Jul. 23, 2014 (KR) .................. 10-2014-0093457

(51) Int. Cl.
*G21C 15/18* (2006.01)
*G21C 1/32* (2006.01)

(52) U.S. Cl.
CPC ............. *G21C 15/18* (2013.01); *G21C 1/326* (2013.01); *Y02E 30/40* (2013.01)

(58) Field of Classification Search
CPC ............................... G21C 15/18; G21C 1/326
(Continued)

(56) References Cited

U.S. PATENT DOCUMENTS

| 4,687,626 | A | * | 8/1987 | Tong | ............. | G21C 15/25 376/283 |
| 2013/0343504 | A1 | * | 12/2013 | Bae | ............. | G21C 15/18 376/299 |
| 2014/0016734 | A1 | * | 1/2014 | Moon | ............. | G21C 15/18 376/282 |

FOREIGN PATENT DOCUMENTS

| JP | 08-005772 | 1/1996 |
| JP | 09-293838 | 12/2009 |

(Continued)

OTHER PUBLICATIONS

International Search Report and Written Opinion for PCT/KR2015/007635, dated Nov. 27, 2015, 19 pages.

*Primary Examiner* — Jack W Keith
*Assistant Examiner* — Daniel Wasil
(74) *Attorney, Agent, or Firm* — Scully Scott Murphy and Presser

(57) ABSTRACT

The present invention relates to a passive heat removal system which circulates cooling fluid to a steam generator via a main water supply line connected to the lower inlet of (Continued)

the steam generator, and a main steam pipe connected to the top outlet of the steam generator, to remove sensible heat of a nuclear reactor coolant system and residual heat of a core. The heat removal system comprises supplementary equipment for receiving surplus cooling fluid or for supplying supplementary cooling fluid in order to maintain the flow rate of the cooling fluid within a predetermined range. The supplementary equipment comprises: a supplementary tank, installed at a height between the lower inlet and the top outlet of the steam generator; a first connection pipe, connected to the main steam pipe and the supplementary tank; and a second connection pipe, connected to the supplementary tank and the main water supply pipe.

15 Claims, 20 Drawing Sheets

(58) Field of Classification Search
USPC .......................................... 376/282, 298, 299
See application file for complete search history.

(56) References Cited

FOREIGN PATENT DOCUMENTS

| KR | 10-1998-0029457 | 7/1998 |
|----|-----------------|--------|
| KR | 2001-0076565 | 8/2001 |
| KR | 2002-0037105 | 5/2002 |
| KR | 10-2010-0134277 | 12/2010 |
| KR | 10-1160772 | 6/2012 |
| KR | 10-1463441 | 11/2014 |

* cited by examiner

PASSIVE HEAT REMOVAL SYSTEM FOR NUCLEAR POWER PLANT

CROSS-REFERENCE TO RELATED APPLICATIONS

This application is the National Stage filing under 35 U.S.C. 371 of International Application No. PCT/KR2015/007635, filed on Jul. 22, 2015, which claims the benefit of earlier filing date and right of priority to Korean Application No. 10-2014-0093457, filed on Jul. 23, 2014, the contents of which are all hereby incorporated by reference herein in their entirety.

BACKGROUND OF THE INVENTION

1. Field of the Invention

The present disclosure relates to a passive residual heat removal system used as one of emergency safety facilities and a nuclear power plant including the same.

2. Description of the Related Art

A residual heat removal system is an emergency safety facility for removing sensible heat in a reactor coolant system and residual heat in a reactor core during an accident. In particular, the passive residual heat removal system removes sensible heat and residual heat in a passive manner using natural forces.

For a coolant circulation method of the passive residual heat removal system, two methods such as 1) a method of directly circulating reactor primary coolant to cool a reactor (AP1000: U.S. Westinghouse) and 2) a method of circulating secondary coolant using a steam generator to cool a reactor (SMART reactor: Korea) are mostly used. In, addition, 3) a method of injecting primary coolant to a tank to directly condense it (CAREM: Argentina) is partially used.

For a passive residual heat removal system to which a secondary coolant circulation method is applied, two types such as 2-1) a mode to which a pressurized makeup tank is applied and both directions of a steam line and a feedwater line of the passive residual heat removal system are isolated with an isolation valve during a normal operation (Korean Patent Application No. 10-2000-0067089), and 2-2) a mode to which gravity water head makeup tank is applied and only one direction of a feedwater line of the passive residual heat removal system is isolated with an isolation valve (IRIS: U.S. Westinghouse, SMART reactor: Korea) are used.

Furthermore, for a method of cooling an outside of a heat exchanger (condensation heat exchanger), 1) a water-cooled method (AP1000) applied to most reactors, 2) a partially air-cooled method (WWER 1000: Russia), and 3) a water-air hybrid cooled method (IMR: Japan) have been used. A heat exchanger of the passive residual heat removal system performs a function of transferring heat received from a reactor to an outside (atmosphere) through an emergency cooling tank (heat sink) or the like, and condensation heat exchangers using a steam condensation phenomenon with an excellent heat transfer efficiency have been mostly used for a heat exchanger method.

A steam generator performs a function of receiving heat in a reactor coolant system to produce steam, and supplying the steam to a turbine system. Furthermore, a secondary side of the steam generator is used as a supply source for producing steam in a passive residual heat removal system. The passive residual heat removal system performs a very important function for removing sensible heat and residual heat in a reactor during an accident. However, the passive residual heat removal system is generally known to exhibit a big difference in the cooling performance according to a coolant flow of the secondary side including the steam generator.

In particular, a once-through type steam generator configured to receive feedwater to a tube side to produce superheated steam in the tube may exhibit a large different secondary water level in the steam generator according to a power operation state of the nuclear power plant. Furthermore, a flow of the passive residual heat removal system during an accident is affected by a time point at which the discharge of steam is suspended or the supply of feedwater is suspended by related signals (valve closed or pump stopped) during the accident. As described above, a coolant flow at a secondary side including the steam generator is affected by an initial water level of the steam generator and a time point at which steam discharge or feedwater is stopped, and the like, and if the coolant flow is unable to maintain an appropriate flow level, it is difficult to accomplish the target performance of the passive residual heat removal system.

Furthermore, a gravity or pressurized makeup tank is provided in the passive residual heat removal system, and those makeup tanks is provided to make up a flow when the flow is insufficient. However, a conventional makeup tank is configured to supply a flow even when the flow is sufficient in a system, thus rather acting as a cause of deteriorating the performance of the passive residual heat removal system.

Non-condensable gas in connection with the present disclosure performs the role of preventing flow and condensation in a heat exchanger such as a condensation heat exchanger to act as a cause of significantly deteriorating the performance of the heat exchanger. A patent associated with a vent system in a passive residual heat removal system associated therewith is disclosed in KR Laid-open Patent Publication No. 2001-0076565. In this patent, it is disclosed a line valve connected to a line subsequent to a main steam isolation valve from an upper portion of a condensation heat exchanger to remove non-condensable gas. However, the patent does not disclose a specific pressure drop scheme, and a connection line is provided subsequent to the main steam isolation valve, and as a result, if the isolation valve of the exhaust line is not closed when the passive residual heat removal system is operated during an accident, then there is a possibility in which the coolant of the passive residual heat removal system is lost through the exhaust line to cause a serious accident.

On the other hand, a steam line of the passive residual heat removal system has a relatively large volume, and the passive residual heat removal system to which a method of opening the steam line is applied is operated in a state that the steam line is open during a normal operation. Accordingly, as the normal operation of a nuclear power plant continues, light non-condensable gas may be accumulated in the steam line. As a result, when an accident requiring the operation of the passive residual heat removal system occurs, the accumulated non-condensable gas may flow into the condensation heat exchanger to prevent steam condensation to cause the performance degradation of the condensation heat exchanger. In consideration of the effect, it is designed in such a way that a condensation heat exchanger capacity of the passive residual heat removal system is conservatively large. However, as a high pressure (for example, SMART reactor: 17 MPa) facility, the passive residual heat removal system has a problem of significantly increasing the cost due to an increase of capacity. Furthermore, as a high-temperature high-pressure facility, the reactor restricts rapid cooling to alleviate thermal shock other than a normal operation and a partially restrictive accident. Accordingly, there is a limit in designing that the capacity of the condensation heat exchanger is conservatively too large.

SUMMARY OF THE INVENTION

An object of the present disclosure is to prevent the dysfunction of a makeup tank associated with a flow at a secondary side of a passive residual heat removal system and alleviate the performance degradation and prediction uncertainty of a condensation heat exchanger due to non-condensable gas to overcome the foregoing problems in the related art.

Another object of the present disclosure is to propose a passive residual heat removal system provided with a makeup facility for performing a function of accommodating excess fluid and compensating for the lack of fluid in a passive residual heat removal system.

Still another object of the present disclosure is to overcome a problem of causing the performance degradation of a passive residual heat removal system due to non-condensable gas accumulated in a line of the system.

In order to accomplish one object of the present disclosure, according to a passive residual heat removal system in accordance with an embodiment of the present disclosure, there is provided a passive residual heat removal system for circulating cooling fluid to a steam generator through a main feedwater line connected to a lower inlet of the steam generator and a main steam line connected to an upper outlet of the steam generator to remove sensible heat in a reactor coolant system and residual heat in a core during an accident, and the passive residual heat removal system may include a makeup facility configured to accommodate excess cooling fluid or supply makeup cooling fluid to maintain an amount of the cooling fluid within a preset range, wherein the makeup facility includes a makeup tank provided at a preset height between a lower inlet and an upper outlet of the steam generator to passively accommodate the excess cooling fluid or supply the makeup cooling fluid according to an amount of the cooling fluid; a first connection line connected to the main steam line and the makeup tank to form a flow path for flowing cooling fluid discharged from the steam generator to the main steam line through the makeup tank; and a second connection line connected to the makeup tank and the main feedwater line to form a supply flow path for supplying cooling fluid supplied from the makeup tank.

According to an example associated with the present disclosure, an initial water level of the makeup tank may be set to either one of a first through a third water level, and the first water level may correspond to a level at which the cooling fluid is fully filled in the makeup tank to supply the makeup cooling fluid when the water level of the steam generator is lower than the water level of the makeup tank during an accident, and the second water level may correspond to a level at which cooling fluid is depleted in the makeup tank to accommodate the excess cooling fluid and supply the accommodated cooling fluid as the makeup cooling fluid during an accident, and the third water level may correspond to a level formed at a height between the first water level and the second water level to accommodate the excess cooling fluid and supply the cooling fluid using initially stored cooling fluid as the makeup cooling fluid.

According to another example associated with the present disclosure, the first connection line may be connected to the main steam line through a steam line of the passive residual heat removal system to receive steam or the cooling fluid from the steam line.

According to a still another example associated with the present disclosure, the makeup facility may further include a circulation line connected to the main steam line and the makeup tank to form a first circulation flow path to prevent non-condensable gas from being accumulated in the makeup tank along with the first connection line.

The first connection line may be connected to the main steam line at a position closer to the steam generator than to the circulation line, and the circulation line may be connected to the main steam line at a position farther from the steam generator than the first connection line to form a flow of steam circulating through the first circulation flow path based on a phenomenon in which a pressure gradually decreases as being further away from the steam generator.

The makeup facility may further include a first pressure drop structure configured to locally cause a decrease of pressure based on a principle in which a pressure relatively decreases according to a speed increase of fluid, and the first pressure drop structure may be provided at a connection portion of the circulation line and the main steam line to form a flow of steam circulating through the first circulation flow path so as to cause a local pressure drop.

The makeup tank, the first connection line and the circulation line may be insulated by an insulator to limit the energy loss of steam passing through the first circulation flow path during the normal operation of a nuclear power plant.

The passive residual heat removal system may include a condensation heat exchanger configured to discharge sensible heat in the reactor coolant system and residual heat in the core received through the circulation of the cooling fluid to an outside; a feedwater line connected to the condensation heat exchanger and the main feedwater line to form a flow path for supplying the cooling fluid from the condensation heat exchanger to the steam generator; a steam line connected to the main steam line and the condensation heat exchanger to form a flow path for supplying cooling fluid discharged from the steam generator to the condensation heat exchanger; and a vent line connected to the steam line and the main steam line to form a second circulation flow path for preventing non-condensable gas from being accumulated in the makeup tank or the steam line.

The passive residual heat removal system may further include an inflow structure configured to induce at least part of a flow of steam circulating through the first circulation flow path and second circulation flow path to a preset flow path, and the inflow structure may include at least one of a first inflow structure extended from the first connection line and inserted into the main steam line to allow an inlet of an internal flow path to face steam flowing through the main steam line so as to induce at least part of steam flowing through the steam line to the first connection line; and a second inflow structure extended from the vent line and inserted into the steam line to allow an inlet of an internal flow path to face steam flowing through the steam line so as to induce at least part of steam flowing through the steam line to the vent line.

The steam line may be connected to the main steam line at a position closer to the steam generator than to the vent line, and the vent line may be connected to the main steam line at a position farther from the steam generator than the steam line to form a flow of steam circulating through the second circulation flow path based on a principle in which a pressure gradually decreases as being further away from the steam generator.

The passive residual heat removal system may further include a second pressure drop structure configured to locally cause a decrease of pressure based on a principle in which the pressure relatively decreases according to a speed increase of fluid, and the second pressure drop structure may be provided at an internal flow path of a connection portion of the vent line and the main steam line to form a flow of steam circulating through the second circulation flow path so as to cause a local pressure drop.

An isolation valve that is open by related signals during an accident may be provided at the feedwater line to initiate the operation of the passive residual heat removal system, and the isolation valve may be provided in duplicate or in parallel or provided along with a check valve for preventing the backflow of feedwater from the main feedwater line, and the second connection line may be connected to the feedwater line at a position between the two isolation valves provided in duplicate or between the isolation valve and the check valve, and connected to the main feedwater line through the feedwater line to form a supply flow path of excess cooling fluid to the makeup tank.

The feedwater line may be connected to the makeup tank to form a flow path for supplying cooling fluid discharged from the condensation heat exchanger to the makeup tank, and the second connection line may be connected to the main feedwater line to form a flow path for supplying cooling fluid received through the feedwater line to the steam generator, and the feedwater line may be connected to the main feedwater line through the makeup tank and the second connection line.

The makeup facility further may include a flow resistance portion, and the flow resistance portion may include at least one of a first flow resistance portion provided at the first connection line to adjust a flow of cooling fluid introduced from the main steam line to the makeup tank; a second flow resistance portion provided at the second connection line to adjust a flow of makeup cooling fluid supplied from the makeup tank to the main feedwater line; and a third flow resistance portion provided at the feedwater line to adjust a flow of cooling fluid supplied from the condensation heat exchanger to the feedwater line.

In order to accomplish the foregoing task, the present disclosure discloses a nuclear power plant having a passive residual heat removal system. The nuclear power plant may include a steam generator provided at a boundary between a primary system and a secondary system; a main feedwater line connected to a lower inlet of the steam generator to supply feedwater from a feedwater system to the steam generator during a normal operation; a main steam line connected to an upper outlet of the steam generator to supply steam from the steam generator to a turbine system during a normal operation; a passive residual heat removal system configured to circulate cooling fluid to a steam generator through the main feedwater line and the main steam line to remove sensible heat in a reactor coolant system and residual heat in a core during an accident; and a makeup facility configured to accommodate excess cooling fluid or supply makeup cooling fluid to maintain an amount of the cooling fluid within a preset range, wherein the makeup facility includes a makeup tank provided at a preset height between a lower inlet and an upper outlet of the steam generator to passively accommodate the excess cooling fluid or supply the makeup cooling fluid according to a water level of the cooling fluid; a first connection line connected to the main steam line and the makeup tank to form a flow path for flowing cooling fluid discharged from the steam generator to the main steam line through the makeup tank; and a second connection line connected to the makeup tank and the main feedwater line to form a supply flow path for supplying cooling fluid supplied from the makeup tank.

According to the present disclosure having the foregoing configuration, a makeup tank is provided at an appropriate position between a lower inlet and a upper outlet of a steam generator, and an upper portion of the makeup tank is filled with steam and a lower portion thereof is filled with makeup cooling fluid, when cooling fluid is excessive in a passive residual heat removal system, the makeup tank may accommodate excess cooling fluid, and on the contrary, when cooling fluid is insufficient in the passive residual heat removal system, the makeup tank may perform a buffer action for supplying makeup cooling fluid.

Furthermore, according to the present disclosure, a steam line of the passive residual heat removal system and a circulation line of the makeup tank may be connected to a main steam line to continuously circulate a small amount of steam during the normal operation of a nuclear power plant. Accordingly, non-condensable gas may not be accumulated in the makeup tank, thereby preventing the performance degradation of a condensation heat exchanger due to non-condensable gas during the operation of the passive residual heat removal system.

When a makeup facility according to the present disclosure is applied to a nuclear power plant, a water level of the steam generator may be maintained within an optimal range to allow the makeup tank to induce an optimal performance of the passive residual heat removal system during an accident. Furthermore, a leak flow rate of the passive residual heat removal system may be compensated by the makeup tank, thereby allowing the passive residual heat removal system to achieve an optimal performance. In addition, the present disclosure may remove non-condensable gas that can be accumulated in the passive residual heat removal system, thereby preventing the performance degradation of the condensation heat exchanger.

Ultimately, the present disclosure may present a scheme capable of removing design uncertainty in the passive residual heat removal system and implementing an optimal performance to facilitate the performance prediction of the passive residual heat removal system. Accordingly, the prediction uncertainty of the passive residual heat removal system may decrease, thereby designing a condensation heat exchanger in an appropriate size and reducing the cost of a condensation heat exchanger facility. A excessive cooling problem of a nuclear power plant according to a conservative condensation heat exchanger design may be alleviated due to a supplicated performance prediction, thereby enhancing safety. Moreover, the design of a more sophisticated condensation heat exchanger may be allowed through the removal of the accumulation of non-condensable gas and the uncertainty of the water level to overcome design difficulties to allow the configuration of a safer passive residual heat removal system.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENT

Figure 1:
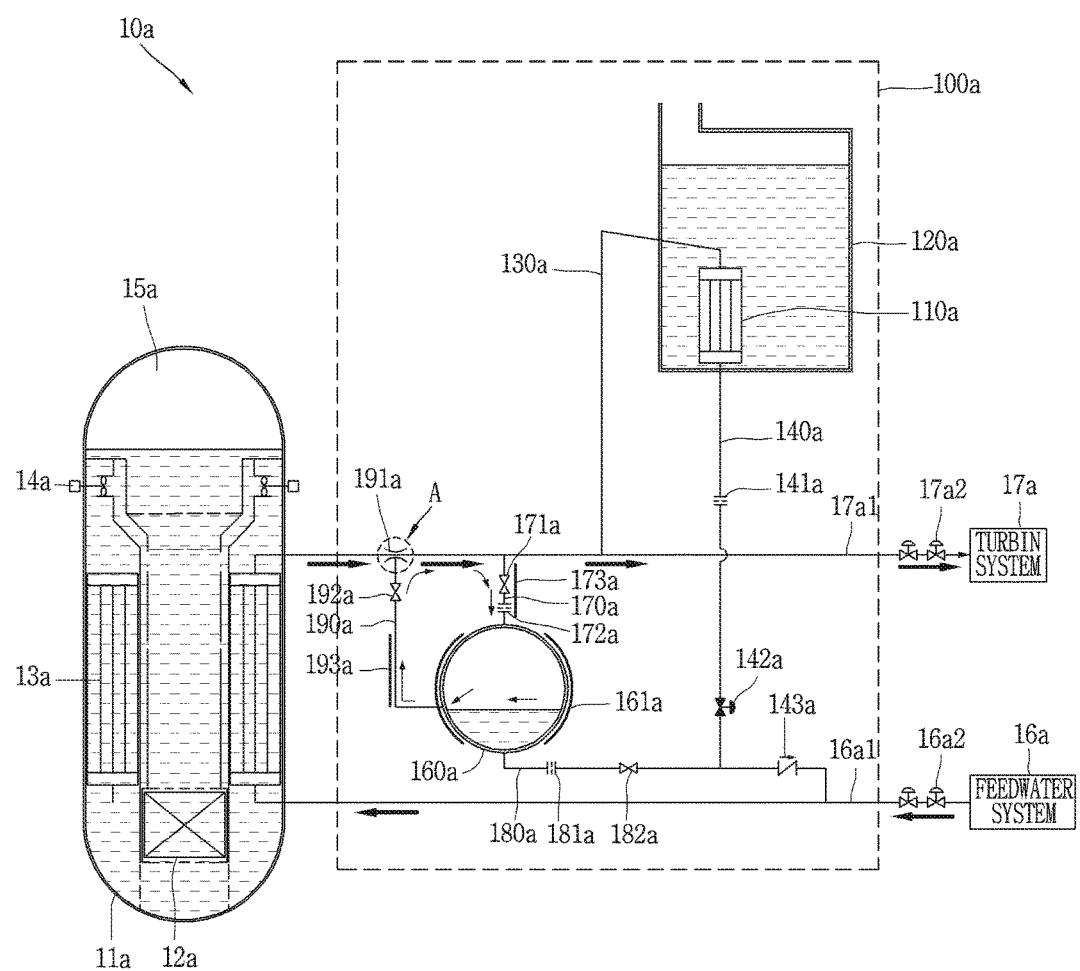
FIG. 1 is a conceptual view illustrating a passive residual heat removal system and a nuclear power plant including the same associated with an embodiment of the present disclosure.

Hereinafter, a nuclear power plant including a passive residual heat removal system associated with the present disclosure will be described in more detail with reference to the accompanying drawings. Even in different embodiments according to the present disclosure, the same or similar reference numerals are designated to the same or similar configurations, and the description thereof will be substituted by the earlier description. Unless clearly used otherwise, expressions in the singular number used in the present disclosure may include a plural meaning.

In the specification, in case where it is mentioned that an element is "connected" to another element, it should be understood that an element may be directly connected to another element, but another element may exist therebetween. On the contrary, in case where it is mentioned that an element is "directly connected" to another element, it should be understood that any other element does not exist therebetween. It is mentioned to be "indirectly connected" when another element exists therebetween.

FIG. 1 is a conceptual view illustrating a passive residual heat removal system 100a and a nuclear power plant 10a including the same associated with an embodiment of the present disclosure.

The nuclear power plant 10a may include a reactor coolant system 11a, a core 12a, a steam generator 13a, a reactor coolant pump 14a, and a pressurizer 15a. In addition to the constituent elements illustrated in FIG. 1, the nuclear power plant 10a may include systems for a normal operation and various systems for securing safety.

The reactor coolant system 11a is a coolant system for transferring and transporting thermal energy generated by fuel fission. An inside of the reactor coolant system 11a is filled with primary fluid. When an accident such as a loss of coolant accident occurs, primary fluid(steam) may be released from the reactor coolant system 11a, and a containment (not shown) prevents radioactive materials from being leaked to an outside.

The steam generator 13a is located at a boundary between a primary system and a secondary system. A lower inlet of the steam generator 13a is connected to a main feedwater line 16a1, and an upper outlet of the steam generator 13a is connected to a main steam line 17a1. During a normal operation of the nuclear power plant 10a, working fluid is supplied to the steam generator 13a through the main feedwater line 16a1 from a feedwater system 16a. Feedwater becomes steam by receiving the heat of the core 12a from primary fluid while passing through the steam generator 13a. The steam is supplied from the steam generator 13a to a turbine system 17a.

The reactor coolant pump 14a is provided to form a flow of primary fluid entering into the core 12a.

The pressurizer 15a maintains a pressurized state exceeding a saturation pressure to suppress the boiling of coolant in the core 12a of a pressurized water reactor, and the pressurizer 15a controls a pressure of the reactor coolant system 11a.

The passive residual heat removal system 100a is an emergency safety facility for removing sensible heat in the reactor coolant system 11a and residual heat in the core 12a during an accident, and in particular, remove sensible heat and residual heat in a passive manner using natural forces. The passive residual heat removal system 100a circulates cooling fluid to the steam generator 13a through the main feedwater line 16a1 and main steam line 17a1.

The passive residual heat removal system 100a may include a condensation heat exchanger 110a, a feedwater line 140a, and a steam line 130a.

The condensation heat exchanger 110a discharges sensible heat in the reactor coolant system 11a and residual heat in the core 12a received through the circulation of cooling fluid to an outside. The condensation heat exchanger 110a may be provided within the emergency cooling tank 120a, and coolant is filled into the emergency cooling tank 120a. Heat is exchanged between cooling fluid (vapor phase) and the coolant of the emergency cooling tank 120a in the condensation heat exchanger 110a. Heat is transferred to the coolant of the emergency cooling tank 120a from cooling fluid (vapor phase). The coolant of the emergency cooling tank 120a is evaporated as the temperature gradually increases. Steam formed by evaporating the coolant is discharged to an outside of the emergency cooling tank 120a. The passive residual heat removal system 100a may remove sensible heat in the reactor coolant system 11a and residual heat in the core 12a through the repetition of the process.

The feedwater line 140a is connected to the condensation heat exchanger 110a and main feedwater line 16a1 to form a flow path for supplying cooling fluid to the steam generator 13a from the condensation heat exchanger 110a. An isolation valve 142a that is open by related signals during an accident is provided at the feedwater line 140a to initiate the operation of the passive residual heat removal system 100a. The isolation valve 142a is provided in duplicate or in parallel or provided along with a check valve 143a for preventing the backflow of feedwater from the main feedwater line 16a1. The isolation valve 142a is open by related signals when an accident occurs, and the check valve 143a is open by a flow of cooling fluid formed during an accident. In particular, referring to FIG. 1, the isolation valve 142a and check valve 143a are provided together at the feedwater line 140a.

Furthermore, a flow resistance portion 141a for adjusting a flow of cooling fluid (liquid phase) supplied from the condensation heat exchanger 110a to the steam generator 13a may be provided at the feedwater line 140a. The flow resistance portion 141a described herein is referred to as a third flow resistance portion 141a to be distinguished from another flow resistance portion that will be described below. The third flow resistance portion 141a may include an orifice or venturi, for example. The third flow resistance portion 141a is provided at an internal flow path of the feedwater line 140a to form a flow resistance so as to adjust a flow of cooling fluid supplied to the steam generator 13a.

The steam line 130a is connected to the main steam line 17a1 and condensation heat exchanger 110a to form a flow path for transferring cooling fluid (vapor phase) discharged from the steam generator 13a to the condensation heat exchanger 110a. Referring to FIG. 1, the steam line 130a may be branched from the main steam line 17a1 and connected to an upper portion of the condensation heat exchanger 110a. The condensation heat exchanger 110a, feedwater line 140a, main feedwater line 16a1, steam generator 13a, main steam line 17a1 and steam line 130a form a circulation flow path for circulating cooling fluid. The circulation flow path described herein is referred to as a third circulation flow path to be distinguished from another circulation flow path which will be described later.

The cooling fluid receives sensible heat in the reactor coolant system 11a and residual heat in the core 12a while circulating through the third circulation flow path, and transfers heat from the condensation heat exchanger 110a to cooling water within the emergency cooling tank 120a. Due to the repetition of the process, the passive residual heat removal system 100a removes sensible heat in the reactor coolant system 11a and residual heat in the core 12a.

As mentioned above as a problem in the background of the invention, the performance of the passive residual heat removal system 100a is affected by an amount of cooling fluid. Accordingly, it may be possible to maximize the performance of the passive residual heat removal system 100a when an amount of cooling fluid is maintained within an optimal range according to the characteristics of the passive residual heat removal system 100a of each nuclear power plant 10a.

The present disclosure may include a makeup facility for deriving the maximum performance of the passive residual heat removal system 100a. The makeup facility may accommodate excess cooling fluid or supply makeup cooling fluid to maintain an amount of cooling fluid within a preset range. For the purpose of this, the makeup facility may include a makeup tank 160a, a first connection line 170a and a second connection line 180a.

The makeup tank 160a is provided at a preset height between a lower inlet and an upper outlet of the steam generator 13a to passively accommodate excess cooling fluid or supply makeup cooling fluid according to an amount of the cooling fluid. When the passive residual heat removal system 100a is operated, the water levels and pressures of the makeup tank 160a, steam generator 13a and condensation heat exchanger 110a, respectively, may form an equilibrium. Furthermore, a change of temperature or pressure and a leakage according to the operation of the passive residual heat removal system 100a have an effect on an amount of cooling fluid. Accordingly, the installation height, water level and pressure of the makeup tank 160a are important factors for maintaining an amount of cooling fluid in an optimal range.

An initial water level of the makeup tank 160a may be set to any one of a first through a third water level. The first through the third water level are referred to distinguish them from one another, but do not denote absolute values.

The first water level corresponds to a level at which cooling fluid is fully filled in the makeup tank 160a to supply makeup cooling fluid when the water level of the steam generator 13a is less than the water level of the makeup tank 160a during an accident. The makeup tank 160a set to the first water level performs only a makeup function, and supplies makeup cooling fluid only when the water level of the steam generator 13a is less than that of the makeup tank 160a during an accident. The first water level may be applicable to a case where an amount of cooling fluid of the passive residual heat removal system 100a is insufficient in all conditions during an accident or a case of the nuclear power plant 10a having a characteristic capable of sufficiently performing the performance even though an amount of cooling fluid is somewhat large as a capacity of the condensation heat exchanger 110a is designed to be large enough.

The second water level corresponds to a level at which cooling fluid is depleted in the makeup tank 160a to accommodate excess cooling fluid and afterward supply the accommodated cooling fluid as makeup cooling fluid during an accident. The makeup tank 160a set to the second water level may further accommodate excess cooling fluid when the excess cooling fluid is additionally generated during a continuous operation subsequent to an accident as well as an early stage of the accident of the passive residual heat removal system 100a. The second water level may be applicable to a case of the nuclear power plant 10a having a characteristic in which an amount of cooling fluid of the passive residual heat removal system 100a is excessive in all conditions during an accident.

The third water level corresponds to a level formed at a height between the first water level and the second water level to accommodate the excess cooling fluid and supply cooling fluid using initially stored cooling fluid as makeup cooling fluid during an accident. The makeup tank 160a set to the third water level may further accommodate excess cooling fluid when the excess cooling fluid is additionally generated during a continuous operation of the passive residual heat removal system 100a. The third water level may be applicable to a case of the nuclear power plant 10a having a characteristic in which a cooling fluid flow of the passive residual heat removal system 100a is insufficient as well as it is excessive according to a condition during an accident.

An initial water level of the makeup tank 160a illustrated in FIG. 1 is set to the third water level. During a normal operation of the nuclear power plant 10a, the water level of the makeup tank 160a is maintained by a circulation flow due to the first connection line 170a and circulation line 190a. Furthermore, the makeup tank 160a accommodates excess cooling fluid during an accident, and supplies cooling fluid using initially stored cooling fluid as makeup cooling fluid.

The makeup tank 160a is insulated by an insulator 161a to limit the energy loss of steam passing through the first circulation flow path during a normal operation of nuclear power plant 10a. When a case without the makeup tank 160a and a case with the makeup tank 160a are compared, a flow path of steam may increase and the energy loss of steam flowing into the turbine system 17a may increase due to the existence of the makeup tank 160a. In order to compensate this disadvantage, the insulator 161a is installed at an outer circumferential surface of the makeup tank 160a to reduce the energy loss of steam.

The first connection line 170a is connected to the main steam line 17a1 and makeup tank 160a to form a flow path of flowing cooling fluid discharged from the steam generator 13a to the main steam line 17a1. Referring to FIG. 1, the first connection line 170a is branched from the main steam line 17a1 and connected to an upper portion of the makeup tank 160a.

A manual valve 171a and a first flow resistance portion 172a may be provided at a flow path of the first connection line 170a.

The manual valve 171a may be manually closed at a time point at which it should be isolated for the maintenance or the like of related facilities subsequent to being open during a normal operation. The first flow resistance portion 172a is provided at an internal flow path of the first connection line 170a to adjust a flow of cooling fluid introduced into the makeup tank 160a from the main steam line 17a1.

The first connection line 170a is also insulated by an insulator 173a to limit the energy loss of steam flowing into the turbine system during a normal operation of the nuclear power plant 10a similarly to the makeup tank 160a.

The second connection line 180a is connected to the makeup tank 160a and main feedwater line 16a1 to form a supply flow path for supplying cooling fluid supplied from the makeup tank 160a. Referring to FIG. 1, the second connection line 180a is branched from the feedwater line 140a and coupled to a lower portion of the makeup tank 160a.

A second flow resistance portion 181a and a manual valve 182a may be provided at a flow path of the second connection line 180a. The second flow resistance portion 181a is provided within the second connection line 180a to adjust a flow of makeup cooling fluid supplied from the makeup tank 160a to the main feedwater line 16a1. The passive valve 182a may be manually closed at a time point at which it should be isolated for the maintenance or the like of related facilities subsequent to being open during a normal operation.

The second connection line 180a may be connected to the feedwater line 140a at a position between the isolation valve 142a and the check valve 143a of the feedwater line 140a. The second connection line 180a is connected to the main feedwater line 16a1 through the feedwater line 140a. Accordingly, when makeup cooling fluid is supplied from the makeup tank 160a, the makeup cooling fluid is introduced into the feedwater line 140a through the second connection line 180a. When excess cooling fluid is introduced into the second connection line 180a, the excess cooling fluid is introduced into the makeup tank 160a through the feedwater line 140a and second connection line 180a. When makeup cooling fluid is supplied from the makeup tank 160a, the makeup cooling fluid and the cooling fluid from the condensation heat exchanger 110a through the feedwater line 140a join together, and then they are supplied to the main feedwater line 16a1.

A makeup facility may further include a circulation line 190a and a pressure drop structure 191a.

The circulation line 190a is connected to the main steam line 17a1 and makeup tank 160a to form a circulation loop for preventing the accumulation of non-condensable gas and maintaining the water level of the makeup tank 160a along with the first connection line 170a. The circulation line 190a is connected to a preset height of the makeup tank 160a. The circulation loop described herein is referred to as a first circulation loop to be distinguished from another circulation loop. The main steam line 17a1, first connection line 170a, makeup tank 160a and circulation line 190a form the first circulation loop.

During a normal operation of the nuclear power plant 10a, non-condensable gas may be accumulated within the makeup tank 160a. However, when the first circulation loop is formed by the circulation line 190a and first connection line 170a connected to the makeup tank 160a, a small amount of steam or a small amount of cooling fluid (two phases of water and vapor) may be continuously circulated through the first circulation loop. As a result, it may be possible to prevent the accumulation of non-condensable gas and prevent the performance degradation of the condensation heat exchanger 110a due to the non-condensable gas along with the first connection line 170a. Furthermore, when the water level increases over a connection portion of the circulation line 190a, a small amount of cooling fluid may be discharged along the circulation line 190a to maintain a preset water level of the makeup tank 160a.

An arrow shown in the drawing indicates a flow of fluid. A relatively large sized arrow indicates a relatively large flow, and a relatively small sized arrow indicates a relatively small flow. On the drawing, it is seen that a flow of steam or cooling fluid (water or two phases) circulating through the first circulation loop is much smaller than that of fluid flowing through the main steam line 17a1.

The circulation line 190a is also insulated by an insulator 193a to limit the energy loss of steam flowing into the turbine system during a normal operation of the nuclear power plant 10a similarly to the makeup tank 160a, first connection line 170a. During a normal operation of the nuclear power plant 10a, the insulator 193a may limit the energy loss of steam circulating through the first connection line 170a, makeup tank 160a and circulation line 190a.

A manual valve 192*a* and a flow resistance portion (not shown) are also provided at the circulation line 190*a*. The manual valve 192*a* may be manually closed at a time point at which it should be isolated for the maintenance or the like of related facilities subsequent to being open during a normal operation.

Though not shown in the drawing, a flow resistance portion (not shown) may be provided at the circulation line 190*a*. The flow resistance portion may include an orifice or venturi that forms a flow resistance at an internal flow path of the circulation line 190*a*. The flow resistance portion is provided to suppress a large amount of flow (water or two phases of water and vapor) from being abruptly discharged and introduced into the turbine system 17*a* according to a variation of water level during a normal operation of the nuclear power plant 10*a*, and limit the circulation flow of steam to a design flow.

The pressure drop structure 191*a* is configured to locally cause a decrease of pressure based on a principle in which a pressure relatively decreases according to a speed increase of fluid. The pressure drop structure 191*a* described herein is referred to as a first pressure drop structure 191*a* to be distinguished from another pressure drop structure. The first pressure drop structure 191*a* is provided at a connection portion between the circulation line 190*a* and the main steam line 17*a*1 to form a flow of steam or cooling fluid (water or two phases) circulating through the first circulation loop so as to cause a local pressure drop.

Since a pressure drop is locally induced at a position at which the first pressure drop structure 191*a* is provided, a circulation flow of steam or cooling fluid (water or two phases) may be formed by a pressure difference induced at the first circulation loop.

The detailed description of the first pressure drop structure 191*a* will be described with reference to FIGS. 2 and 3.

Figure 2:
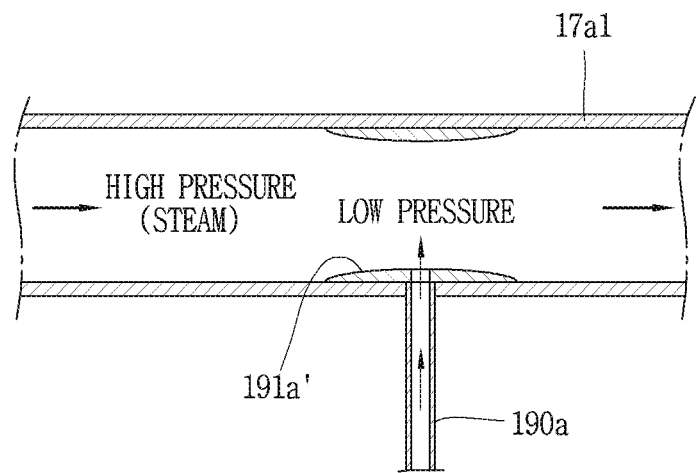
FIG. 2 is a conceptual view illustrating the detailed structure of portion "A" illustrated in FIG. 1.

FIG. 2 is a conceptual view illustrating the detailed structure of portion "A" illustrated in FIG. 1.

An upper outlet of the steam generator 13*a* (refer to FIG. 1) is connected to one end portion of the main steam line 17*a*1 (an end portion disposed when continuously extended to the left side of the main steam line 17*a*1 in FIG. 2), and the turbine system 17*a* (refer to FIG. 1) is connected to the other end portion of the main steam line 17*a*1 (an end portion disposed when continuously extended to the right side of the main steam line 17*a*1 in FIG. 2).

The first pressure drop structure 191*a* may include an orifice or venturi provided at an internal flow path of the main steam line 17*a*1. The pressure drop structure 191*a* forms a flow resistance at an internal flow path of the main steam line 17*a*1, and at least part thereof is open not to block a flow path connected to the circulation line 190*a*.

High-pressure steam flows into the main steam line 17*a*1. The speed increases while the high-pressure steam passes through the first pressure drop structure 191*a*. The first pressure drop structure 191*a* locally induces a drop of pressure. Accordingly, steam or cooling fluid within the circulation line 190*a* flows to a low pressure side, and the circulation flow of steam or cooling fluid is formed at the first circulation loop.

Figure 3:
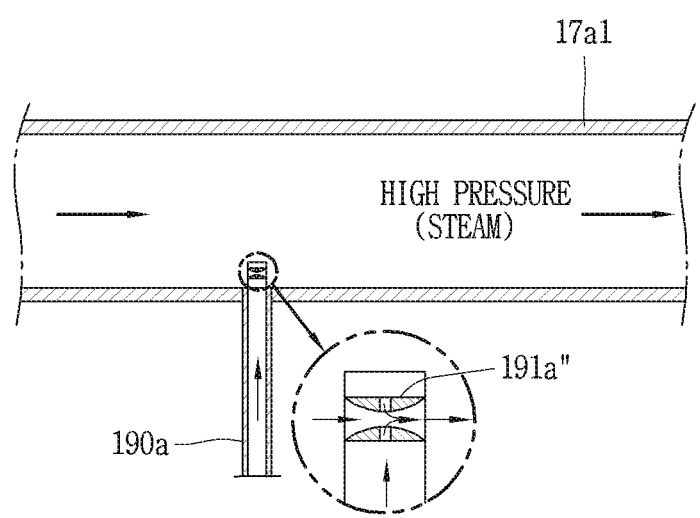
FIG. 3 is a conceptual view illustrating another example of portion "A" illustrated in FIG. 1.

FIG. 3 is a conceptual view illustrating another example of portion "A" illustrated in FIG. 1.

An upper outlet of the steam generator 13*a* (refer to FIG. 1) is connected to one end portion of the main steam line 17*a*1 (an end portion disposed when continuously extended to the left side of the main steam line 17*a*1 in FIG. 2), and the turbine system 17*a* (refer to FIG. 1) is connected to the other end portion of the main steam line 17*a*1 (an end portion disposed when continuously extended to the right side of the main steam line 17*a*1 in FIG. 2).

The first pressure drop structure 191*a* may be provided at the circulation line 190*a*. The first pressure drop structure 191*a* is provided at an end portion of the circulation line 190*a*, and protruded within the main steam line 17*a*1 and exposed at an inner flow path of the main steam line 17*a*1. Referring to FIG. 3, the first pressure drop structure 191*a* is configured to form a partially narrow flow path within the main steam line 17*a*1. The first pressure drop structure 191*a* is configured to form a flow path of steam or cooling fluid (fluid that has passed through the first circulation flow path) in a direction (a direction of flowing from the bottom to the top) crossing a flow direction (a direction of flowing from the left to the right) of high-pressure steam, and the steam or cooling fluid and the high-pressure steam join together. It may be configured to introduce steam or cooling fluid eve in an opposite direction (a direction of flowing from the top to the bottom) to the flow direction of steam or cooling fluid.

The speed of high-pressure steam increases while passing through a narrow flow path formed by the pressure drop structure 191*a*. Furthermore, a pressure difference between different portions of the first circulation flow path is formed due to a local pressure drop induced by the first pressure drop structure 191*a*. Steam or cooling fluid may flow through the first circulation flow path due to the pressure difference.

Hereinafter, an operation in case the nuclear power plant 10*a* including the passive residual heat removal system 100*a* illustrated in FIG. 1 is in a normal operation or an anticipated accident state will be described.

Figure 4:
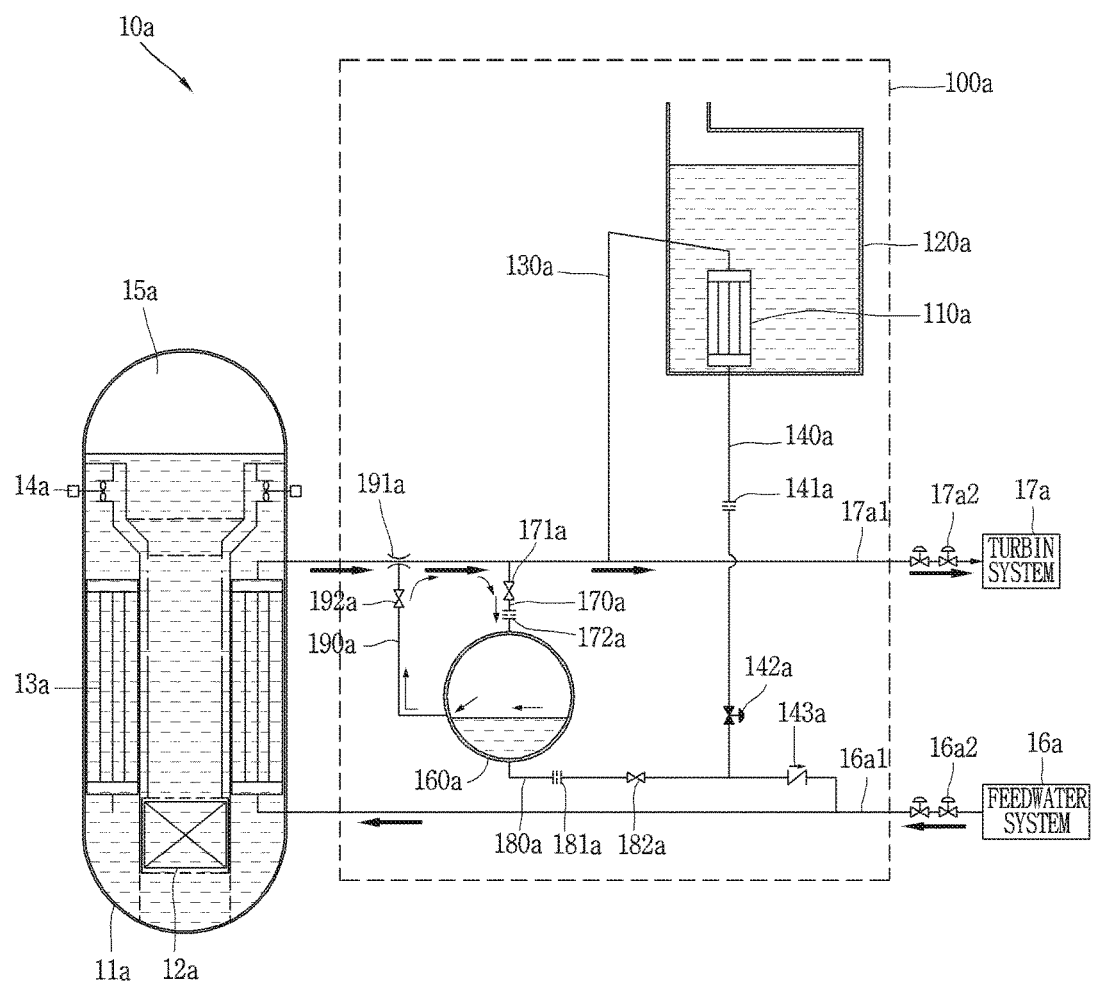
FIG. 4 is a conceptual view illustrating a normal operation state of the nuclear power plant including the passive residual heat removal system illustrated in FIG. 1.

FIG. 4 is a conceptual view illustrating a normal operation state of the nuclear power plant 10*a* including the passive residual heat removal system 100*a* illustrated in FIG. 1.

During a normal operation of the nuclear power plant 10*a*, an isolation valve 17*a*2 provided at the main steam line 17*a*1 and an isolation valve 16*a*2 provided at the main feedwater line 16*a*1 are open. Feedwater is supplied from the feedwater system 16*a* to the steam generator 13*a* through the main feedwater line 16*a*1. The check valve 143*a* for allowing only a uni-directional flow to pass therethrough is provided at the feedwater line 140*a*. During a normal operation of the nuclear power plant 10*a*, an internal pressure of the main feedwater line 16*a*1 is higher than that of the feedwater line 140*a*, and thus the check valve 143*a* is not open. Accordingly, the check valve 143*a* may prevent feedwater from flowing backward from the main feedwater line 16*a*1 to the feedwater line 140*a*.

Feedwater exchanges heat with primary fluid while passing through the steam generator 13*a*. The feedwater is heated to become steam by the heat of the core 12*a* received from primary fluid. Steam formed by heating feedwater is discharged through an upper outlet of the steam generator 13*a*, and supplied to the turbine system 17*a* through the main steam line 17*a*1.

During a normal operation of the nuclear power plant 10*a*, the manual valve 171*a*, 192*a* provided at the first connection line 170*a* and circulation line 190*a* are open, respectively. Most of steam passing through the main steam line 17*a*1 is supplied to the turbine system 17*a*. A small amount of steam flowing through the main steam line 17*a*1 is supplied to the makeup tank 160*a* through the first connection line 170*a*, and discharged to the main steam line 17*a*1 through the circulation line 190*a* again. Actuating power that circulates steam is provided from a pressure difference formed by the first pressure drop structure 191*a*. non-condensable gas is prevented from being accumulated in the makeup tank 160*a* while a small amount of steam continuously circulates through the first connection line 170a and circulation line 190a connected to the makeup tank 160a.

During a normal operation of the nuclear power plant 10a, the water level of the makeup tank 160a is maintained below a height at which the circulation line 190a is connected to makeup tank 160a. The water level formed above a connection height of the circulation line 190a is sprayed and discharged to the main steam line 17a1 through the circulation line 190a.

Figure 5:
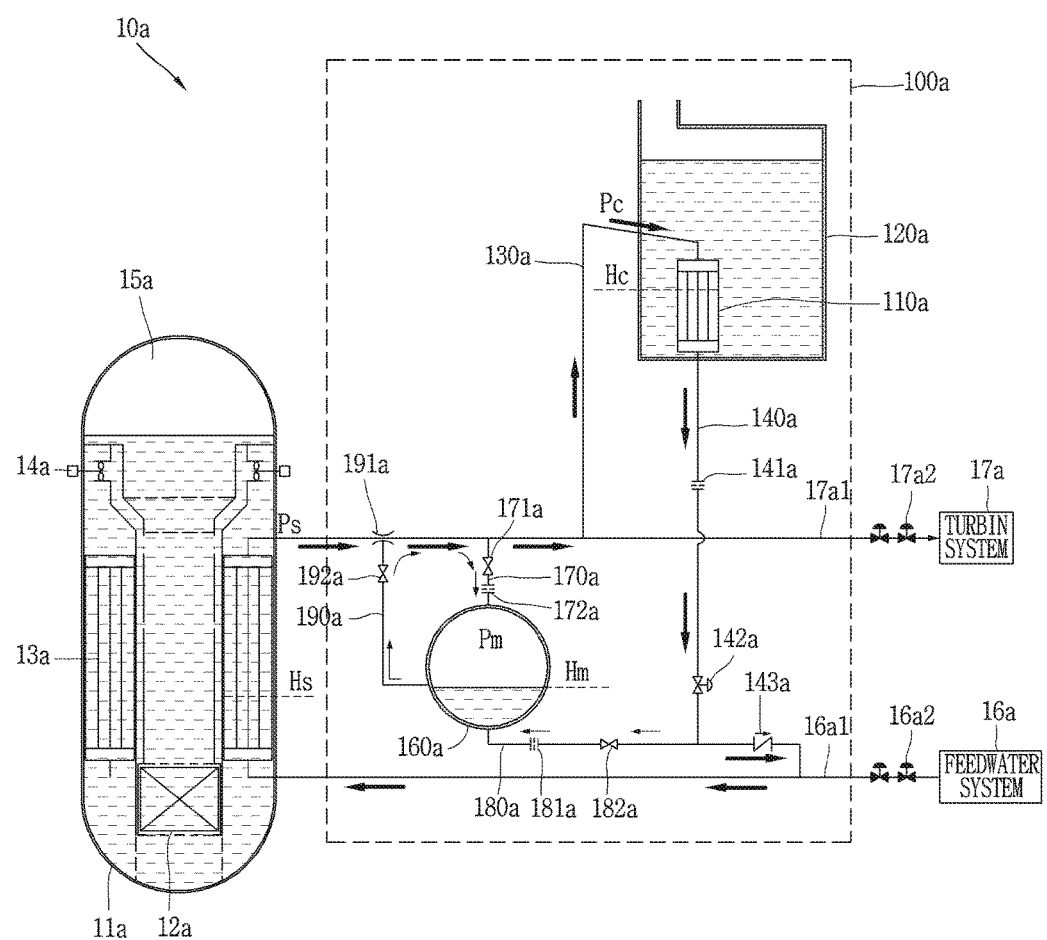
FIG. 5 is a conceptual view illustrating a valve operation during an accident of the nuclear power plant including the passive residual heat removal system illustrated in FIG. 1.

FIG. 5 is a conceptual view illustrating a valve operation during an accident of the nuclear power plant 10a including the passive residual heat removal system 100a illustrated in FIG. 1.

When an accident requiring the operation of the passive residual heat removal system 100a occurs in the nuclear power plant 10a, isolation valves 16a2, 17a2 provided at the main feedwater line 16a1 and main steam line 17a1 are closed by related signals. Accordingly, the supply of feedwater from the feedwater system 16a is stopped, and the supply of steam to the turbine system 17a is also stopped. When an accident requiring the operation of the passive residual heat removal system 100a occurs in the nuclear power plant 10a, the isolation valve 142a provided at the feedwater line 140a is open by relates signals.

As the isolation valves 16a2, 17a2 provided at the main feedwater line 16a1 and main steam line 17a1 are closed and the isolation valve 142a provided at the feedwater line 140a is open, a flow path of fluid circulating through the steam generator 13a is changed to form a third circulation flow path connected to the condensation heat exchanger 110a, feedwater line 140a, main feedwater line 16a1, steam generator 13a, main steam line 17a1, steam line 130a and condensation heat exchanger 110a. As a result, the passive residual heat removal system 100a starts the operation.

Cooling fluid (liquid phase) is supplied to the steam generator 13a while sequentially passing through the feedwater line 140a and main steam line 17a1, and the cooling fluid (liquid phase) is heated to become steam by receiving sensible heat in the reactor coolant system 11a and residual heat in the core 12a at the steam generator 13a. The cooling fluid (steam phase) is discharged to an upper outlet of the steam generator 13a, and transferred to the condensation heat exchanger 110a through the steam line 130a. The cooling fluid (steam phase) transfers heat to the coolant of the emergency cooling tank 120a from the condensation heat exchanger 110a and condenses. The cooling fluid that has transferred heat to the coolant of the emergency cooling tank 120a and condensed is supplied to the steam generator 13a again through the feedwater line 140a and main feedwater line 16a1. Sensible and residual heat in the reactor coolant system 11a can be removed by the circulation of the cooling fluid.

Since the manual valve 182a provided at the second connection line 180a is open, part of cooling fluid supplied from the condensation heat exchanger 110a through the feedwater line 140a may flow to the makeup tank 160a through the second connection line 180a. Furthermore, the manual valve 171a provided at the first connection line 170a and the manual valve 192a provided at the circulation line 190a are also open, and thus part of steam generated by the evaporation of cooling fluid may be supplied to the makeup tank 160a through the first connection line 170a prior to flowing into the condensation heat exchanger 110a and then discharged to the main steam line 17a1 through the circulation line 190a again. However, since a flow of steam formed in the circulation line 190a during an accident is very small compared to that formed during a normal operation, the circulation line 190a during an accident cannot perform the non-condensable gas removal and a water level maintenance function of the makeup tank 160a, which is performed during a normal operation.

Ps indicates a pressure of the steam generator 13a, and Hs indicates a water level of the steam generator 13a. Pm indicates a pressure of the makeup tank 160a, and Hm indicates a water level of the makeup tank 160a. Pc indicates a pressure of the condensation heat exchanger 110a, and Hc indicates a water level of the condensation heat exchanger 110a. At the time point of starting the operation of the passive residual heat removal system 100a, the pressure (Ps), water level (Hs) of the steam generator 13a, the pressure (Pm), water level (Hm) of the makeup tank 160a, and the pressure (Pc), water level (Hc) of the condensation heat exchanger 110a are not in an equilibrium state.

Figure 6:
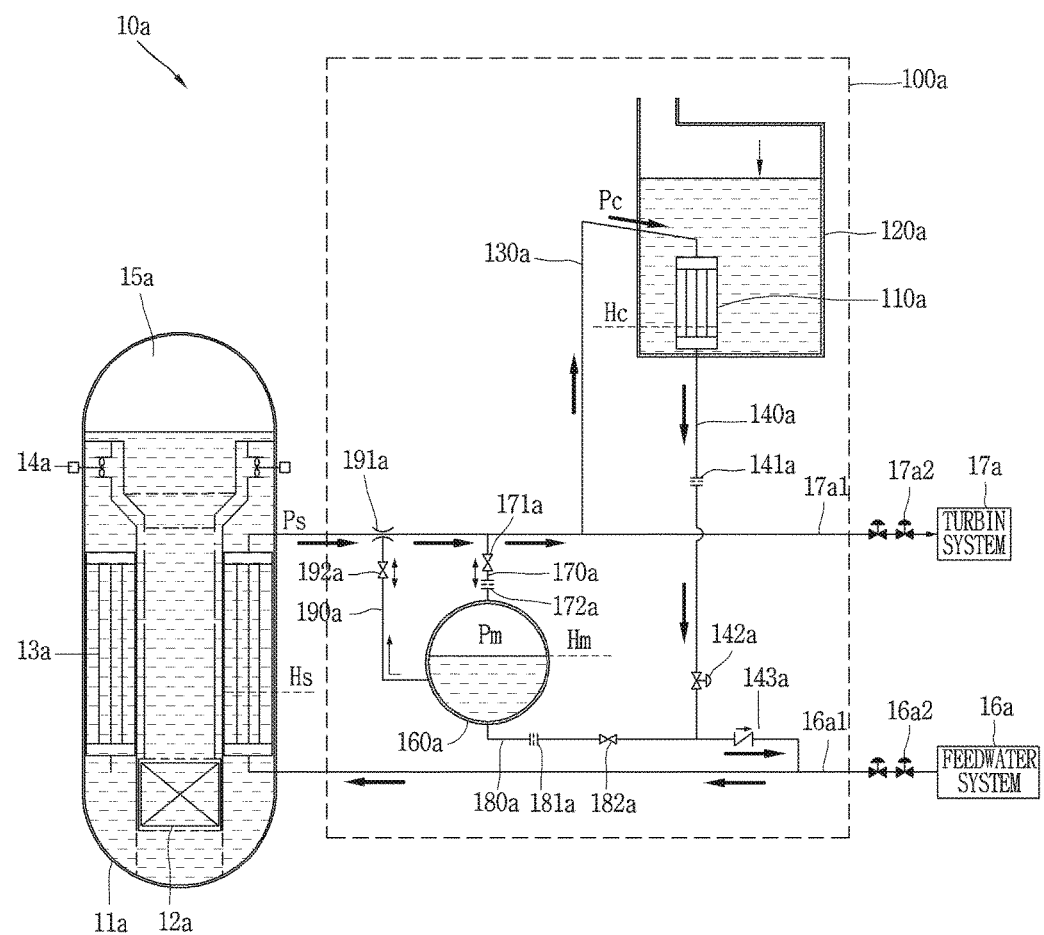
FIG. 6 is a conceptual view illustrating a water level equilibrium state according to the progression of an accident in the nuclear power plant including the passive residual heat removal system illustrated in FIG. 1.

FIG. 6 is a conceptual view illustrating a water level equilibrium state according to the progression of an accident in the nuclear power plant 10a including the passive residual heat removal system 100a illustrated in FIG. 1.

When the operation of the passive residual heat removal system 100a starts and time passes, excess cooling fluid (excess cooling fluid at an upper portion higher than an initial water level of the makeup tank 160a, provided that a water level in consideration of pressure equilibrium) within cooling fluid circulating through the passive residual heat removal system 100a is returned to the makeup tank 160a. Furthermore, the pressure (Ps) and water level (Hs) of the steam generator 13a, the pressure (Pm) and water level (Hm) of the makeup tank 160a, and the pressure (Pc) and water level (Hc) of the condensation heat exchanger 110a form an equilibrium state.

In a state that the operation of the passive residual heat removal system 100a continues, a large flow of cooling fluid does not occur. Furthermore, the makeup tank 160a, first connection line 170a and circulation line 190a are insulated by the insulator 161a, 173a, 193a (refer to FIG. 1), no significant heat loss occurs. As a result, the pressure (Ps) of the steam generator 13a and the pressure (Pm) of the makeup tank 160a are maintained at similar pressures and thus a water level in consideration of a loss of pressure and a change of density difference due to flow resistance is similarly maintained.

Figure 7:
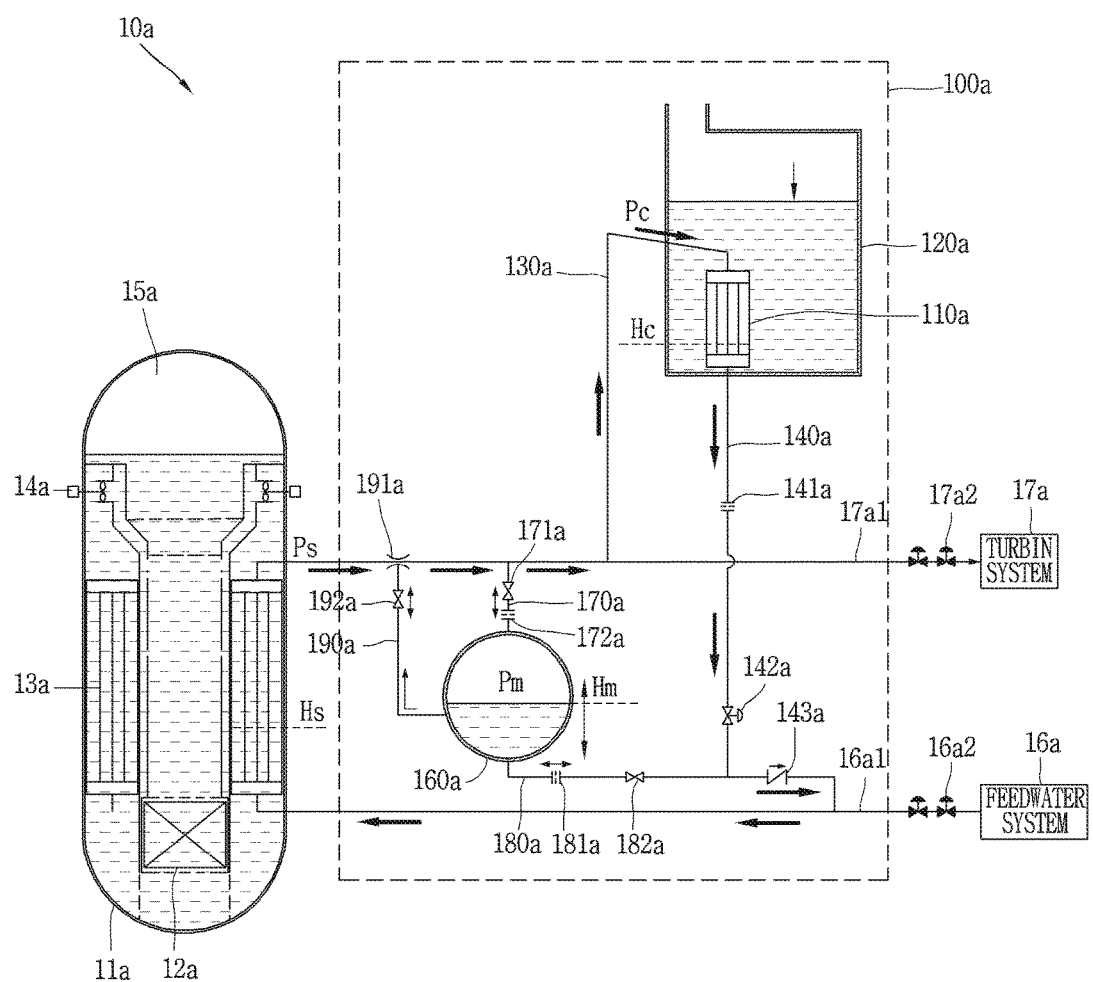
FIG. 7 is a conceptual view for accommodating excess cooling fluid into a makeup tank according to the progression of an accident in the nuclear power plant including the passive residual heat removal system illustrated in FIG. 1.

FIG. 7 is a conceptual view for accommodating excess cooling fluid into a makeup tank according to the progression of an accident in the nuclear power plant 10a including the passive residual heat removal system 100a illustrated in FIG. 1.

A temperature or pressure change according to the operation of the passive residual heat removal system 100a and a flow change of cooling fluid according to the leakage are accommodated in the makeup tank 160a. Excess cooling fluid is introduced into the makeup tank 160a to increase the water level of the makeup tank 160a. As a result, the pressure (Ps) and water level (Hs) of the steam generator 13a, the pressure (Pm) and water level (Hm) of the makeup tank 160a, and the pressure (Pc) and water level (Hc) of the condensation heat exchanger 110a form an equilibrium state.

Figure 8:
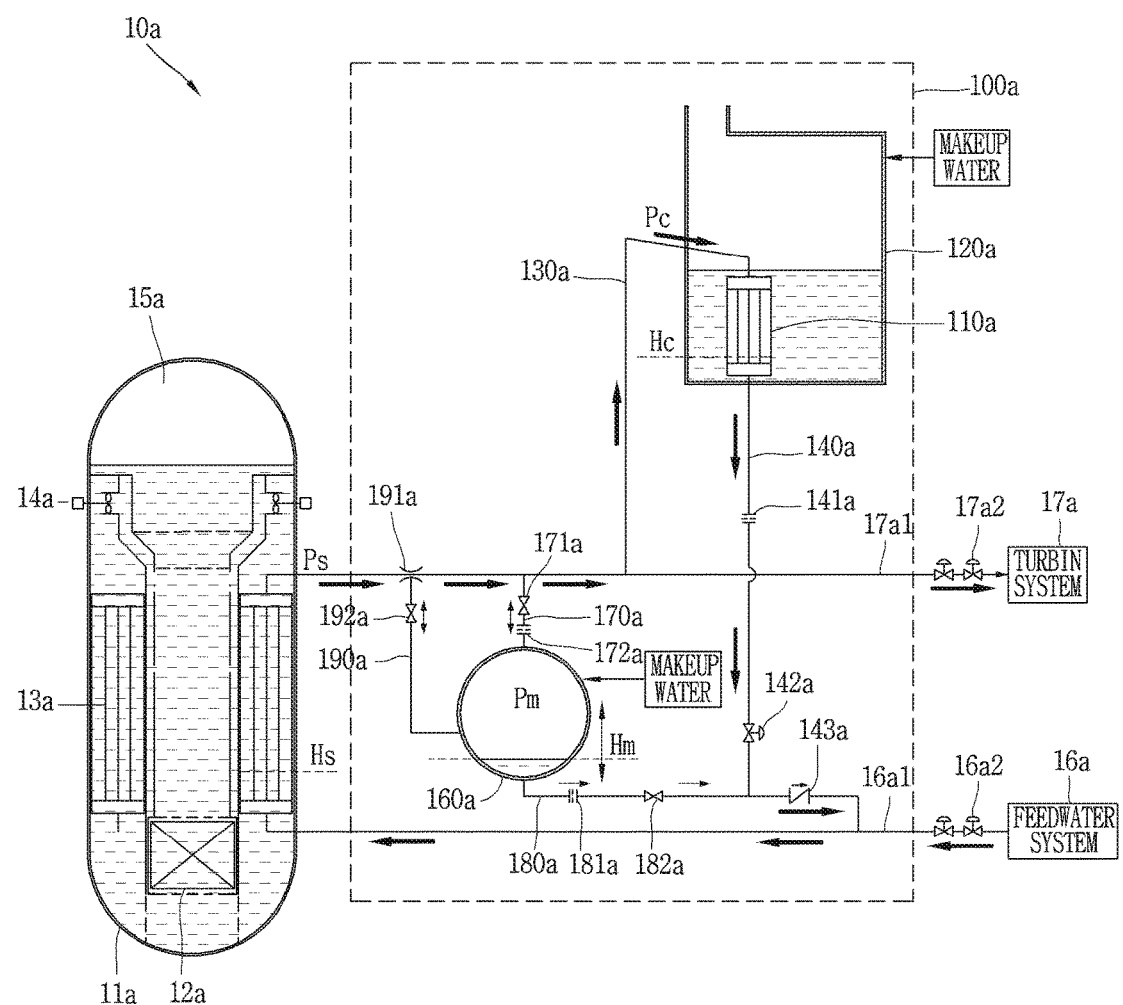
FIG. 8 is a conceptual view for supplying makeup cooling fluid from a makeup tank according to the progression of an accident in the nuclear power plant including the passive residual heat removal system illustrated in FIG. 1.

FIG. 8 is a conceptual view for supplying makeup cooling fluid from a makeup tank according to the progression of an accident in the nuclear power plant 10a including the passive residual heat removal system 100a illustrated in FIG. 1.

When cooling fluid circulating through the second connection line 180a is insufficient, the makeup tank 160a supplies makeup cooling fluid to the steam generator 13a through the second connection line 180a. As a result, the pressure (Ps) and water level (Hs) of the steam generator 13a, the pressure (Pm) and water level (Hm) of the makeup tank 160a, and the pressure (Pc) and water level (Hc) of the condensation heat exchanger 110a continuously form an equilibrium state.

During the operation of the passive residual heat removal system 100a for a long period of time, cooling fluid circulating through the passive residual heat removal system 100a may decrease due to a small amount of leakage. A decrease of cooling fluid may be checked through a water level measurement of the makeup tank 160a or the like. In this case, makeup water may be additionally injected into the passive residual heat removal system 100a to continuously maintain an appropriate water level.

Figure 9:
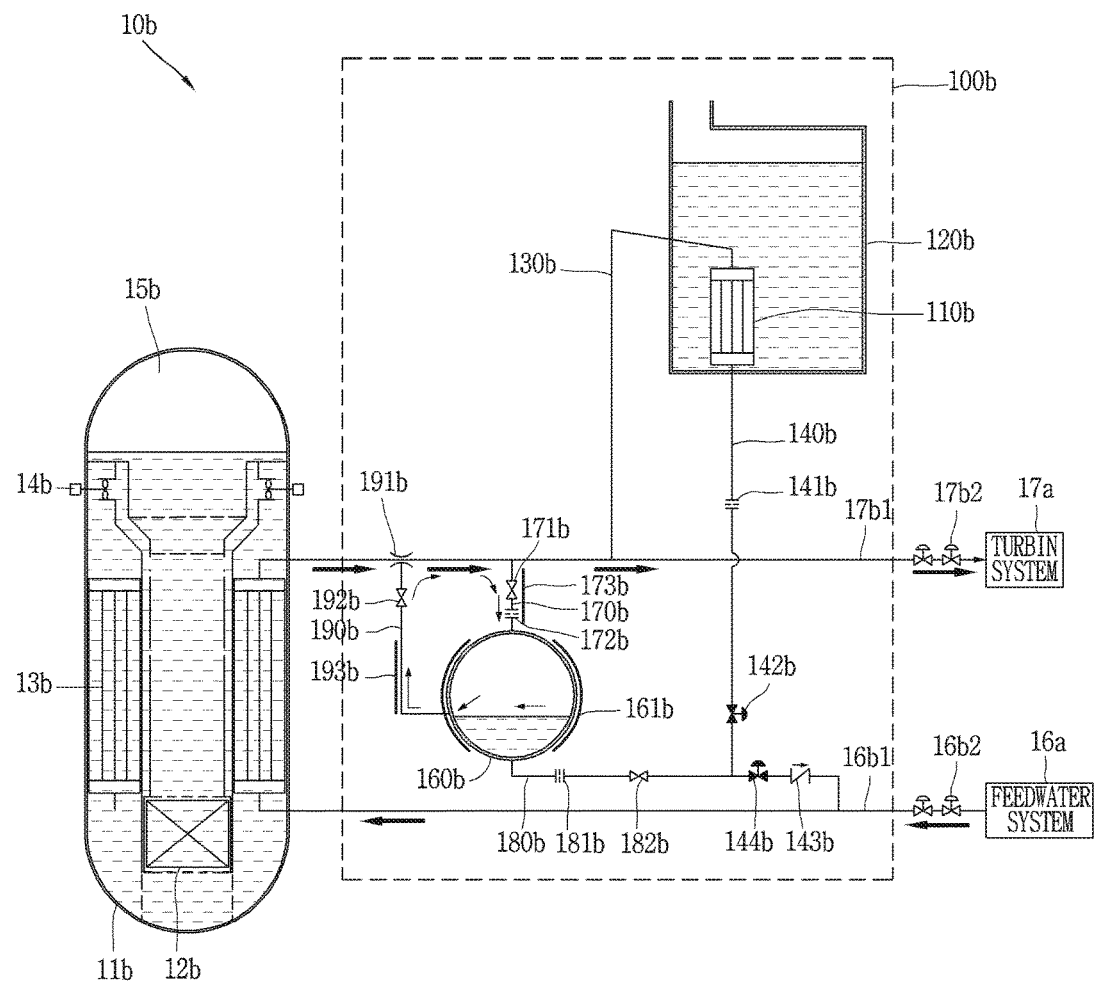
FIG. 9 is a conceptual view illustrating a modified example of the nuclear power plant including the passive residual heat removal system illustrated in FIG. 1.

FIG. 9 is a conceptual view illustrating a modified example of the nuclear power plant 10b including the passive residual heat removal system 100b illustrated in FIG. 1.

Isolation valves 142b, 144b may be provided in duplicate or in parallel (not shown) at a feedwater line 140b. Furthermore, a check valve 143b may be also provided at the feedwater line 140b along with the isolation valves 142b, 144b provided in duplicate. Furthermore, a second connection line 180b is connected to the feedwater line 140b at a position between two isolation valves 142b, 144b, and the second connection line 180b is connected to the a main feedwater line 16b1 through the feedwater line 140b. The remaining configuration will be substituted by the earlier description of FIG. 1.

Figure 10:
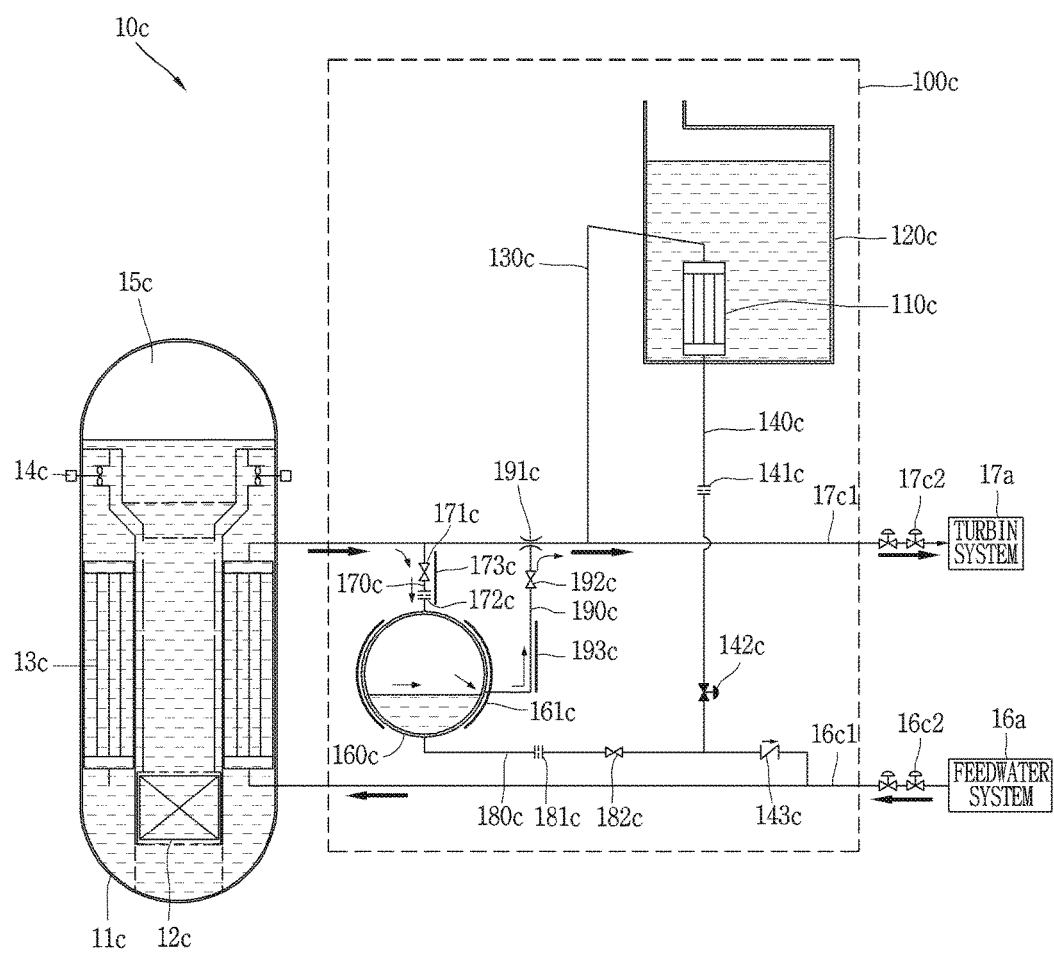
FIG. 10 is an another conceptual view illustrating a modified example of the nuclear power plant including the passive residual heat removal system illustrated in FIG. 1.

FIG. 10 is an another conceptual view illustrating a modified example of the nuclear power plant 10c including the passive residual heat removal system 100c illustrated in FIG. 1.

Referring to FIG. 1 prior to examining FIG. 10, the first connection line 170a and steam line 130a are sequentially connected to the main steam line 17a1 in a direction of being further away from the steam generator 13a. The passive residual heat removal system 100c and nuclear power plant 10c illustrated in FIG. 10 have a different connection sequence from that of FIG. 1.

Referring to FIG. 10, a first connection line 170c, a circulation line 190c and a steam line 130c are sequentially connected to a main steam line 17c1 in a direction of being further away from a steam generator 13c. If a connection sequence of FIG. 10 is referred to as a forward connection, then a connection sequence of FIG. 1 may be referred to as a backward connection.

A configuration in which steam is introduced into a makeup tank 160c through a first connection line 170c, and returned to the main steam line 17c1 through a circulation line 190c will be substituted by the earlier description. Furthermore, due to this, it may be possible to prevent non-condensable gas from being accumulated in the makeup tank 160c and maintain a water level of the makeup tank 160c.

Figure 11:
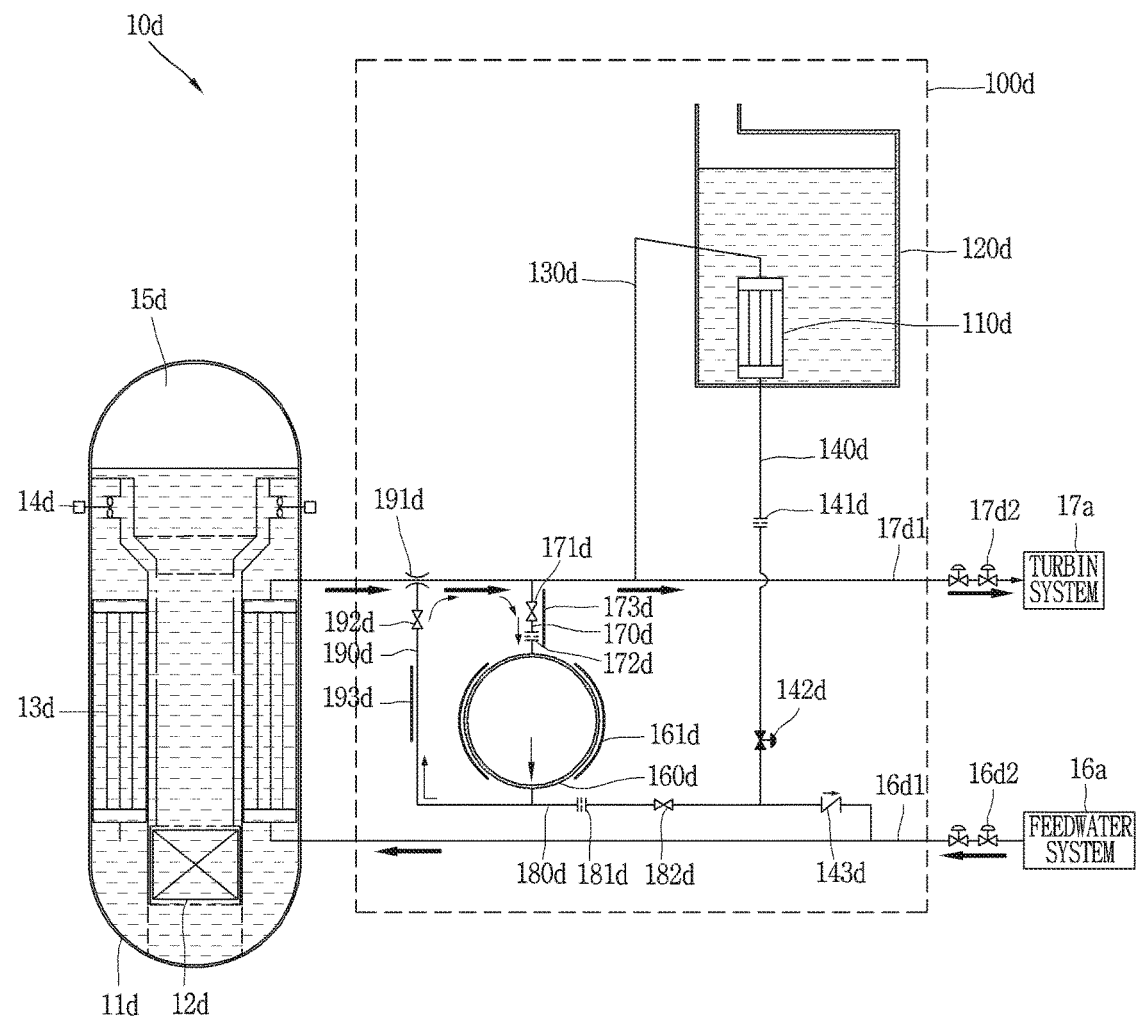
FIG. 11 is a still another conceptual view illustrating a modified example of the nuclear power plant including the passive residual heat removal system illustrated in FIG. 1.

FIG. 11 is a still another conceptual view illustrating a modified example of the nuclear power plant 10d including the passive residual heat removal system illustrated 100d in FIG. 1.

The water level of the makeup tank 160d is set to a second water level. A cooling fluid flow of the passive residual heat removal system 100d during an accident may be different according to the design characteristics of the nuclear power plant 10d. The second water level corresponds to a level at which cooling fluid is depleted in the makeup tank 160d to accommodate excess cooling fluid and supply the accommodated cooling fluid as makeup cooling fluid during an accident. The makeup tank 160d set to the second water level may further accommodate excess cooling fluid when the excess cooling fluid is additionally generated during a continuous operation subsequent to an accident as well as an early stage of the accident of the passive residual heat removal system 100d. The second water level may be applicable to a case of the nuclear power plant 10d having a characteristic in which a cooling fluid flow of the passive residual heat removal system 100d is excessive in all conditions during an accident.

A circulation line 190d is branched from a feedwater line 140d and connected to a main steam line 17d1. Accordingly, the circulation line 190d is connected to the makeup tank 160d through the feedwater line 140d.

Figure 12:
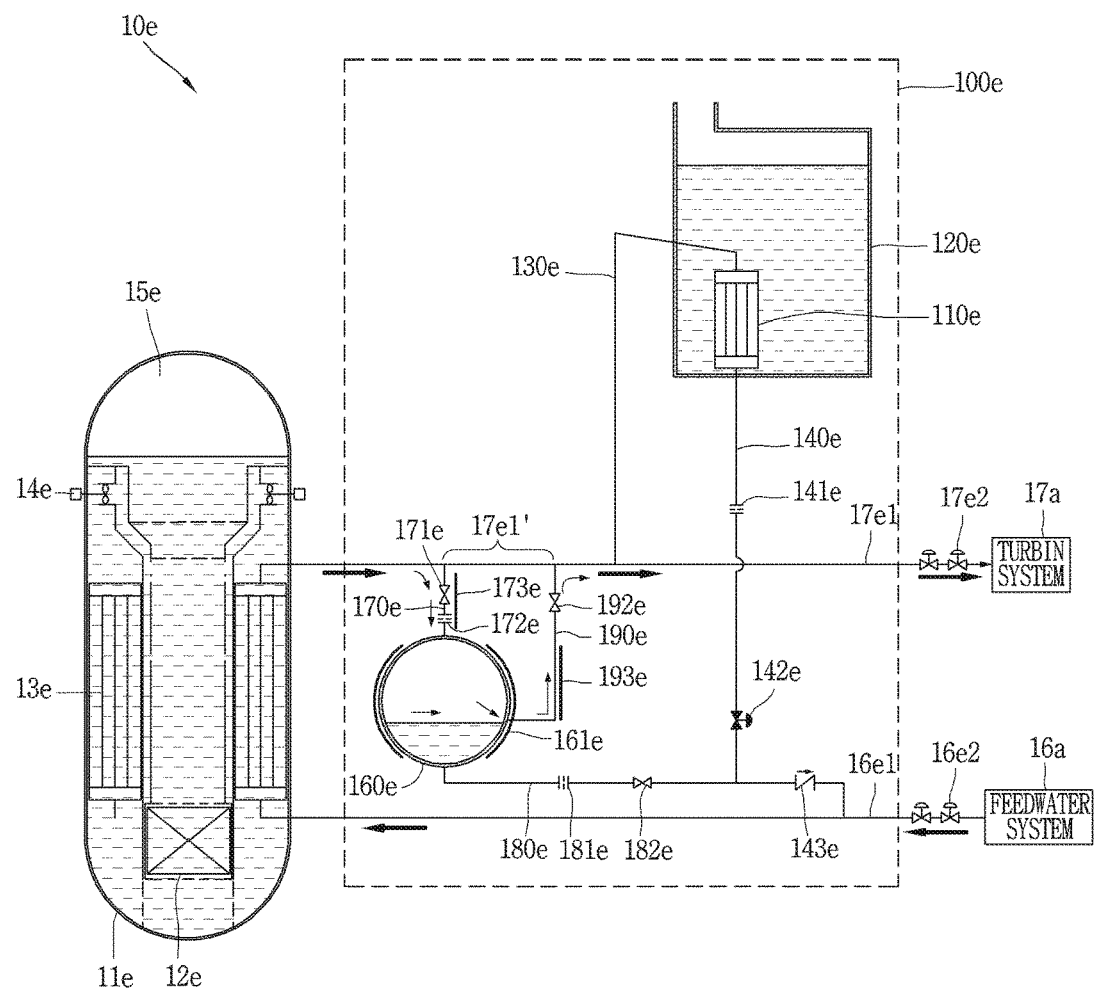
FIG. 12 is a yet still another conceptual view illustrating a modified example of the nuclear power plant including the passive residual heat removal system illustrated in FIG. 1.

FIG. 12 is a yet still another conceptual view illustrating a modified example of the nuclear power plant 10e including the passive residual heat removal system 100e illustrated in FIG. 1.

Referring to FIG. 12, the sequence of connecting a first connection line 170e and a circulation line 190e to a main steam line 17e1 corresponds to a forward connection described in FIG. 10. When the first connection line 170e and circulation line 190e are sequentially provided between the steam generator 13e and an isolation valve of the main steam line 17e1, and a flow resistance region 17e1' is formed at the main steam line 17e1, a circulation flow may be formed using a pressure drop according to a line length of the main steam line 17e1.

As located away from the steam generator 13e, a pressure of the main steam line 17e1 gradually decreases. Based on such a principle, when the first connection line 170e is connected to the main steam line 17e1 at a position closer to the steam generator 13e than to the circulation line 190e, and the circulation line 190e is connected to the main steam line 17e1 at a position farther from the steam generator 13e than the first connection line 170e, a circulation flow may be formed without a first pressure drop structure 191e.

In particular, the flow resistance region 17e1' may be formed between a connection portion of the first connection line 170e and a connection portion of the circulation line 190e in the main steam line 17e1 to induce the formation of a circulation flow. The flow resistance region 17e1' may induce the flow of a small amount of steam to the first connection line 170e.

Figure 13:
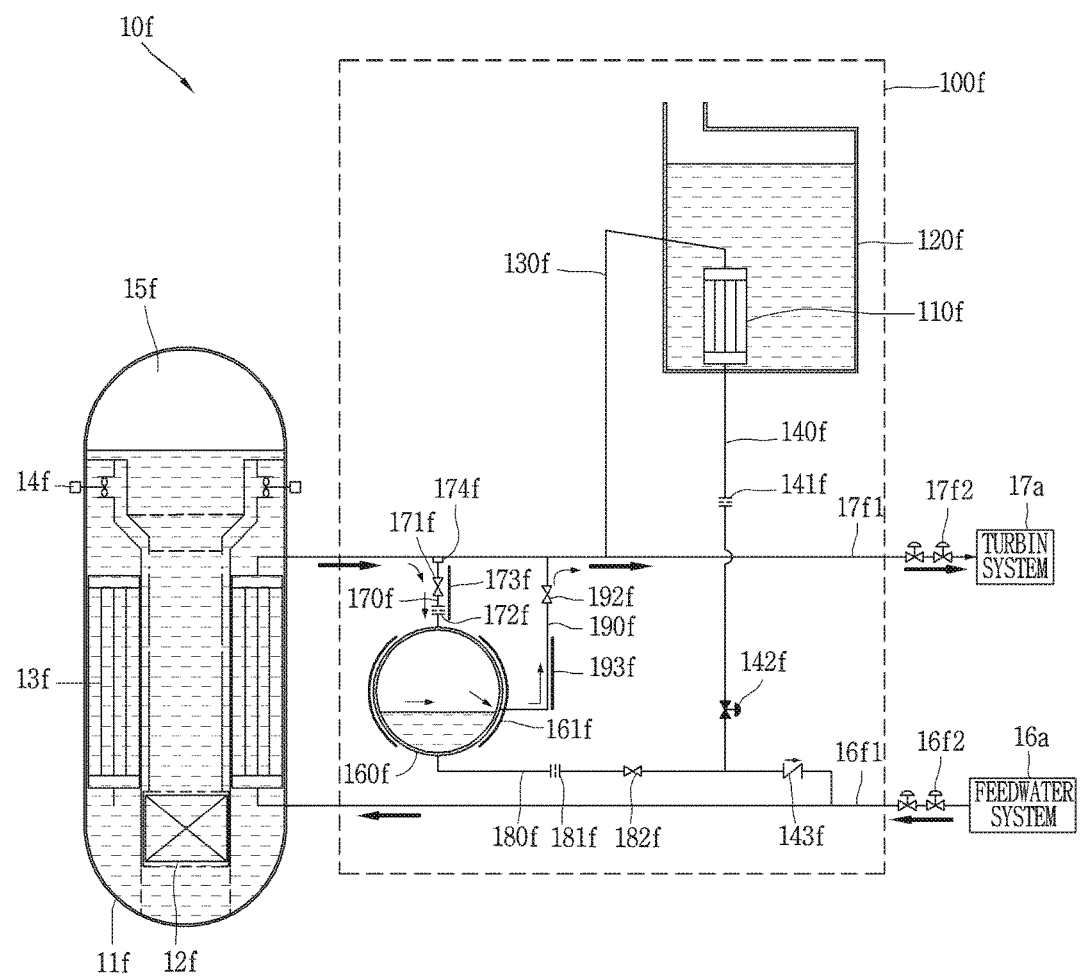
FIG. 13 is a still yet another conceptual view illustrating a modified example of the nuclear power plant including the passive residual heat removal system illustrated in FIG. 1.

FIG. 13 is a still yet another conceptual view illustrating a modified example of the nuclear power plant 10f including the passive residual heat removal system 100f illustrated in FIG. 1.

A first connection line 170f and a circulation line 190f have a forward connection structure. The first connection line 170f, makeup tank 160f and circulation line 190f form a first circulation flow path.

The passive residual heat removal system 100f may further include an inflow structure 174f configured to induce at least part of a flow steam or cooling fluid (water or two phases) circulating through the first circulation loop to a preset flow path. The inflow structure 174f may be provided at any position between a portion connected to a steam generator 13f and an installation portion of an isolation valve 17f2 in a main steam line 17f1 to induce a flow.

The inflow structure described herein is referred to as a first inflow structure 174f to be distinguished from an inflow structure disposed at another place, and the inflow structure disposed at another place is referred to as a second inflow structure. The detailed structure of the first inflow structure 174f will be described with reference to FIGS. 14 and 15.

Figure 14:
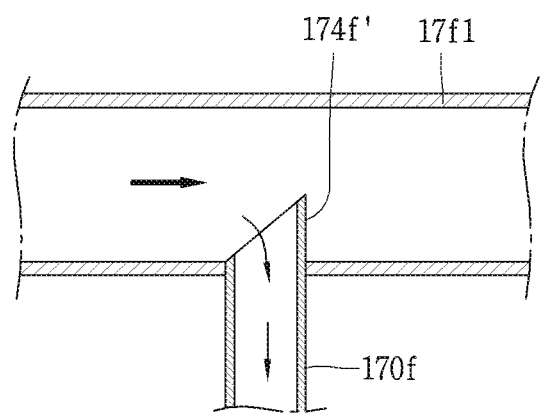
FIG. 14 is a conceptual view illustrating the detailed structure of an inflow structure illustrated in FIG. 13.

FIG. 14 is a conceptual view illustrating the detailed structure of the inflow structure 174f illustrated in FIG. 13.

A first inflow structure 174f' is extended from the first connection line 170f and inserted into the main steam line 17f1 to induce at least part of steam flowing through the main steam line 17f1 to the first connection line 170f. An inlet of an internal flow path of the first inflow structure 174f' faces steam flowing through the main steam line 17f1. Due to such a structure, a small amount of steam within steam flowing through the main steam line 17f1 flows to the side of the first connection line 170f.

Figure 15:
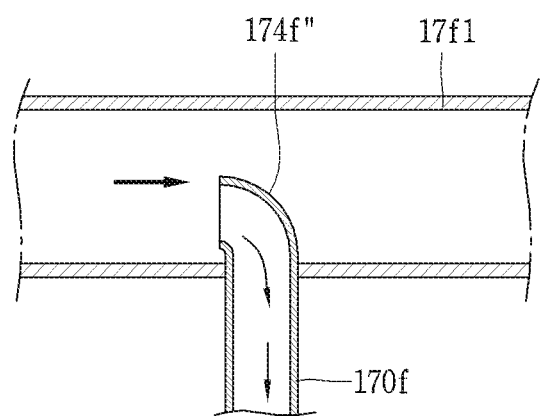
FIG. 15 is another conceptual view of an inflow structure illustrated in FIG. 13.

FIG. 15 is another conceptual view of the inflow structure 17f illustrated in FIG. 13.

A first inflow structure 174f'' may be bent in a curved shape on the contrary to the first inflow structure 174f' illustrated in FIG. 14. An inlet of the first inflow structure 174f'' faces a flow of steam flowing through the mode switching intention 17f1 at the front side, thereby efficiently inducing the flow of steam to the side of the first connection line 170f.

Figure 16:
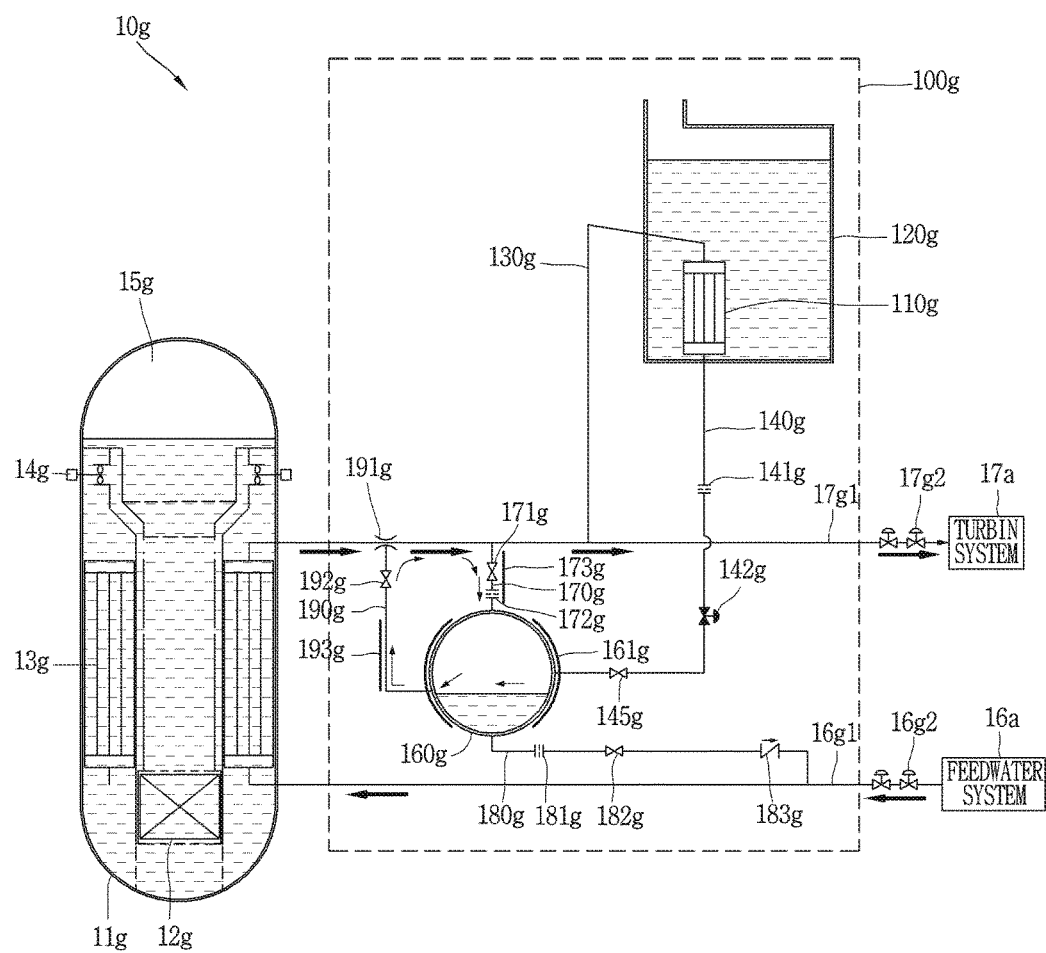
FIG. 16 is a still another conceptual view illustrating a modified example of the nuclear power plant including the passive residual heat removal system illustrated in FIG. 1.

FIG. 16 is a still another conceptual view illustrating a modified example of the nuclear power plant 10g including the passive residual heat removal system 100g illustrated in FIG. 1.

A feedwater line 140g is connected to a makeup tank 160g to form a flow path for supplying cooling fluid discharged from a condensation heat exchanger 110g to the makeup tank 160g. The feedwater line 140g is connected to a main feedwater line 16g1 through the makeup tank 160g and second connection line 180g. A manual valve 145g is provided at the feedwater line 140g to be manually closed at a time point that requires maintenance. A check valve 183g is provided at a second connection line 180g to prevent feedwater from flowing backward from the main feedwater line 16g1 to the makeup tank 160g.

The second connection line 180g is connected to the main feedwater line 16g1 to form a flow path for supplying cooling fluid stored therewithin and cooling fluid received through the feedwater line 140g to a steam generator 13g.

According to the foregoing configuration, the passive residual heat removal system 100g is operated as a mechanism of collecting cooling fluid supplied from the condensation heat exchanger 110g to the makeup tank 160g and supplying the collected cooling fluid to the steam generator 13g again.

Figure 17:
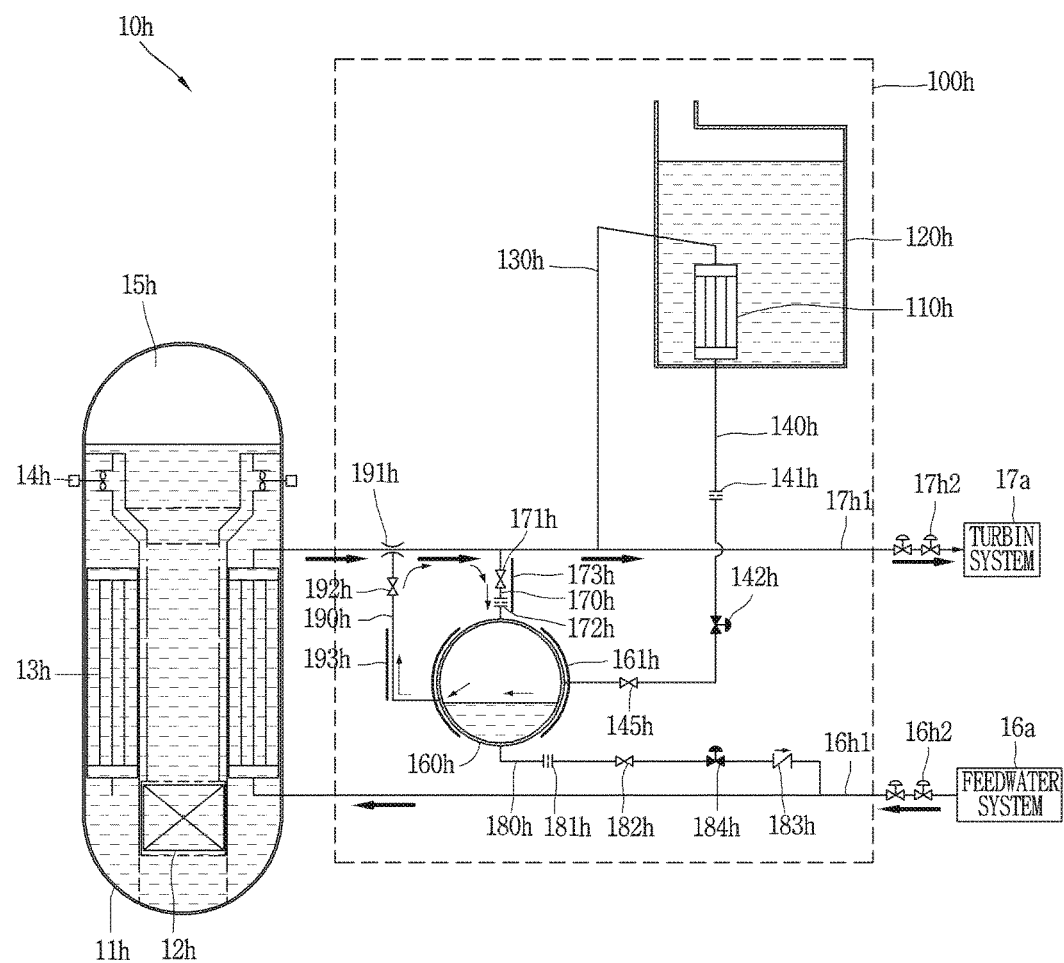
FIG. 17 is a yet still another conceptual view illustrating a modified example of the nuclear power plant including the passive residual heat removal system illustrated in FIG. 1.

FIG. 17 is a yet still another conceptual view illustrating a modified example of the nuclear power plant 10h including the passive residual heat removal system 100h illustrated in FIG. 1.

Similarly to FIG. 16, in FIG. 17, a feedwater line 140h is connected to a main feedwater line 16h1 through a makeup tank 160h and a second connection line 180h. The feedwater line 140h is connected to the makeup tank 160h to form a flow path for supplying cooling fluid discharged from a condensation heat exchanger 110h to the makeup tank 160h. A check valve 183a and an isolation valve 184h may be respectively provided at the feedwater line 140h. The isolation valve 184h is open by related signals at a time point that requires the operation of the passive residual heat removal system 100h. The check valve 183h prevents feedwater from flowing backward from a main steam line 17h1 to the makeup tank 160h, and open by a flow of makeup cooling fluid when the makeup cooling fluid is supplied from the makeup tank 160h.

Figure 18:
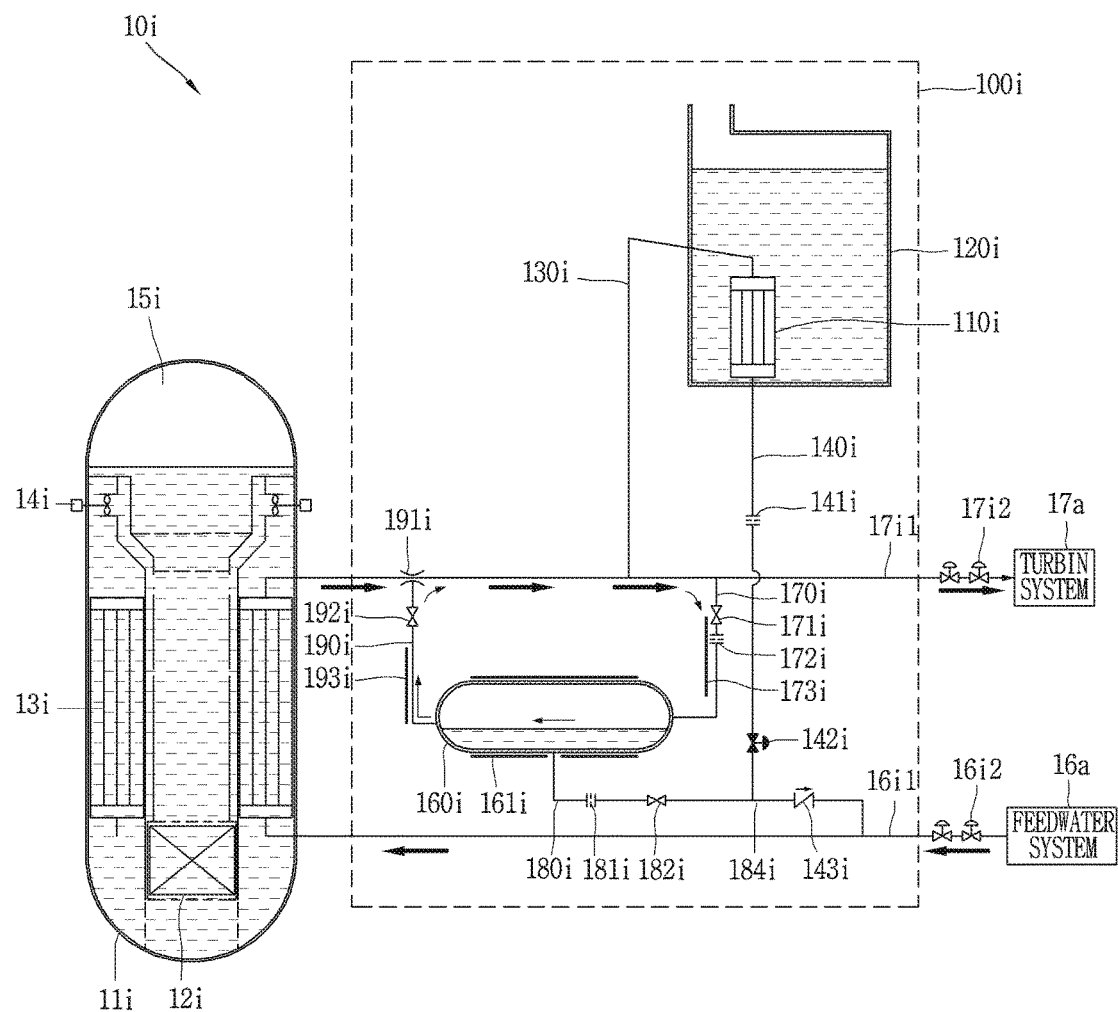
FIG. 18 is a still another conceptual view illustrating a modified example of the nuclear power plant including the passive residual heat removal system illustrated in FIG. 1.

FIG. 18 is a still another conceptual view illustrating a modified example of the nuclear power plant 10i including a passive residual heat removal system 100i illustrated in FIG. 1.

Various shapes such as a spherical shape, a cylindrical shape, a rectangular shape both end portions of which are formed in a hemispherical shape or the like may be applicable to the shape of a makeup tank 160i. However, assuming that it is configured with the same volume, the shape of the makeup tank 160i with a low height and a large area is advantageous for minimizing a variation of the water level and maintaining an optimal water level of a steam generator 13i. In case where the makeup tank 160i in a rectangular shape is provided, it is more advantageous to have a lying-down shape.

Referring to FIG. 18, the makeup tank 160i is formed in a shape in which both end portions thereof is formed in a hemispherical shape with a rectangular lying-down shape.

Figure 19:
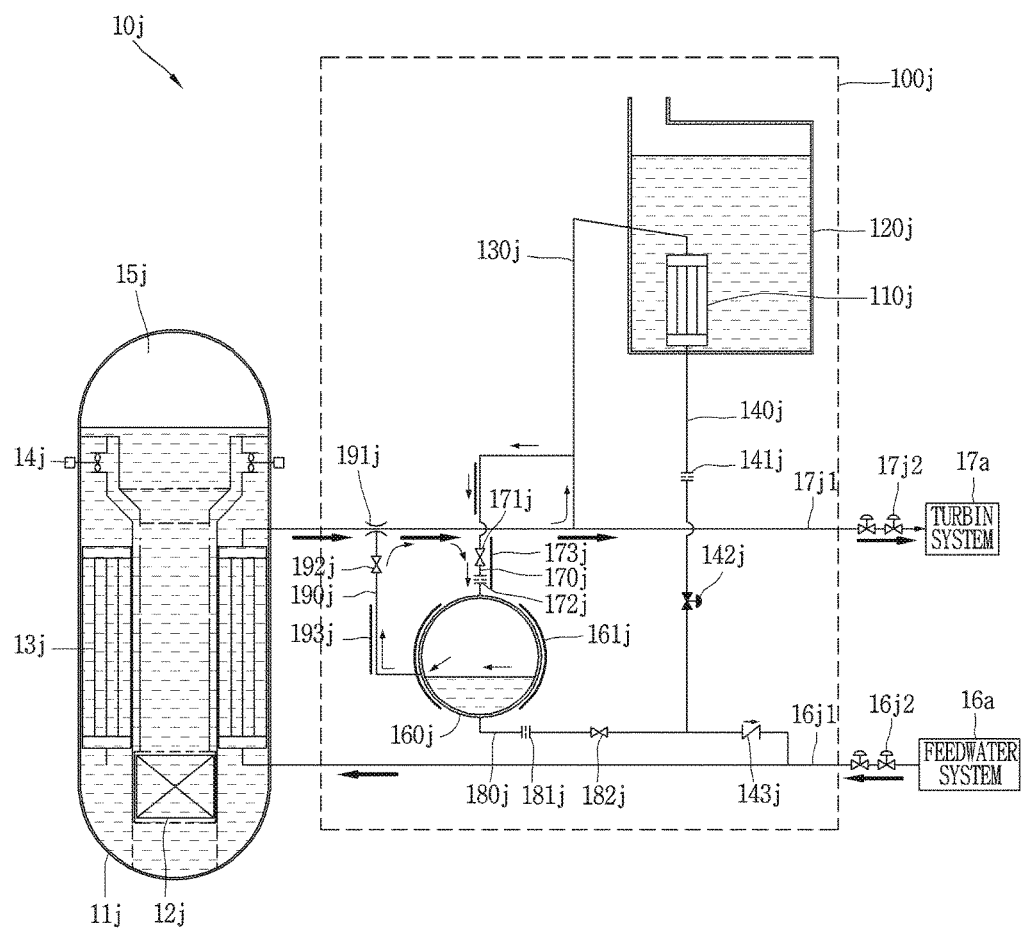
FIG. 19 is a yet still another conceptual view illustrating a modified example of the nuclear power plant including the passive residual heat removal system illustrated in FIG. 1.

FIG. 19 is a yet still another conceptual view illustrating a modified example of the nuclear power plant 10j including the passive residual heat removal system 100j illustrated in FIG. 1.

A first connection line 170j may be connected to an appropriate position of a steam line 130j according to the convenience of the installation.

The first connection line 170j is connected to a main steam line 17j1 through the steam line 130j to receive steam from the steam line 130j of the passive residual heat removal system 100j. The steam line 130j is branched from the main steam line 17j1, and the first connection line 170j is branched from the steam line 130j and connected to a makeup tank 160j. Steam flowing through the main steam line 17j1 is introduced into the steam line 130j, and the steam is introduced into the first connection line 170j again, and supplied to the makeup tank 160j through the first connection line 170j.

The foregoing structure is formed for the purpose of forming a circulation flow of steam or cooling fluid in a first circulation loop to maintain a water level of the makeup tank 160j as well as prevent non-condensable gas from being accumulated in the makeup tank 160j.

Figure 20:
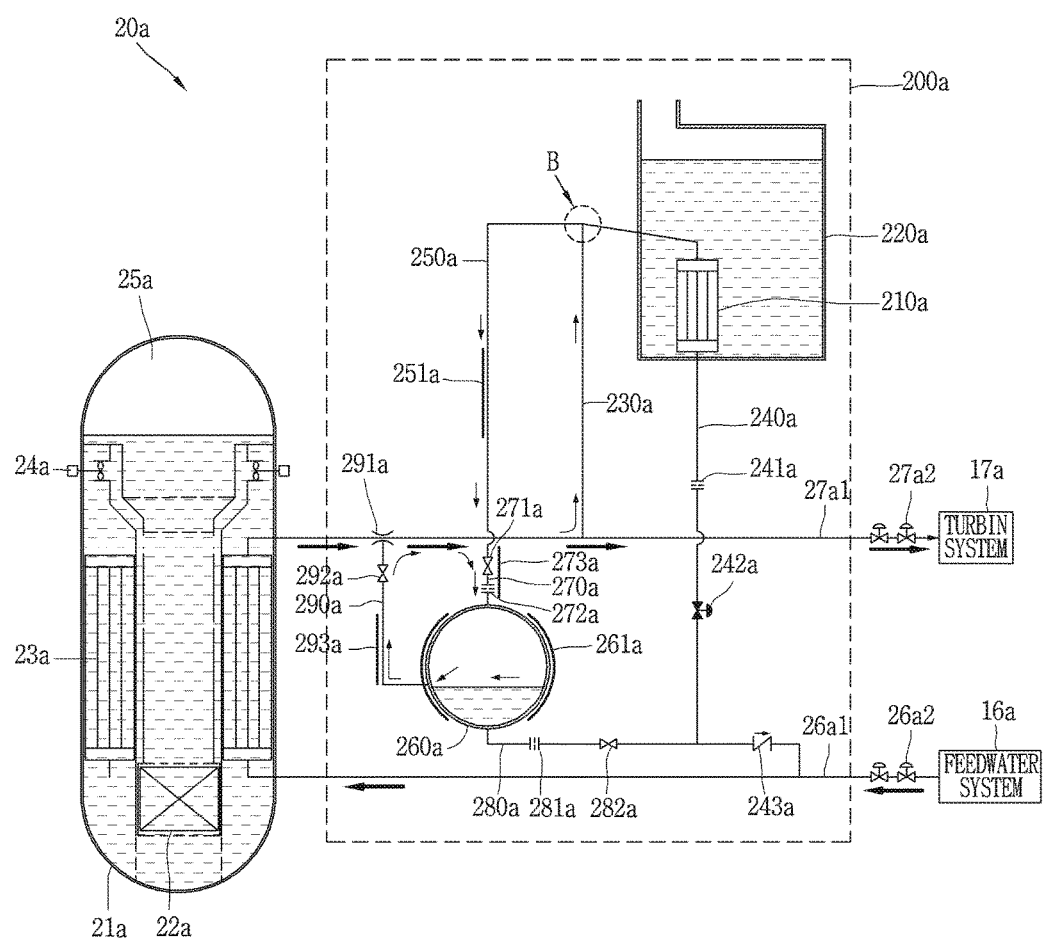
FIG. 20 is a conceptual view illustrating another passive residual heat removal system and a nuclear power plant including the same.

FIG. 20 is a conceptual view illustrating another passive residual heat removal system 200a and a nuclear power plant 20a including the same.

The passive residual heat removal system 200a may further include a steam line 230a and a vent line 250a connected to a main steam line 27a1 to form a circulation loop for preventing non-condensable gas from being accumulated in a makeup tank 260a or steam line 230a and maintaining a water level of the makeup tank 260a. The circulation loop described herein is referred to as a second circulation loop to be distinguished from the foregoing first circulation loop.

The vent line 250a is branched from the steam line 230a. Referring to FIG. 20, the vent line 250a is connected to the makeup tank 260a through a first connection line 270a, and connected to the main steam line 27a1 through the makeup tank 260a and a circulation line 290a. A small amount of steam flowing the main steam line 27a1 through the vent line 250a is introduced into the makeup tank 260a, and therefore it may be possible to prevent non-condensable gas from being accumulated in the makeup tank 260a through the process. The foregoing configuration is also used for the purpose of preventing non-condensable gas from being accumulated in the makeup tank 260a and steam line 230a. The circulation line 290a, vent line 250a and makeup tank 260a are integrated into one system.

Steam flowing through the main steam line 27a1 is introduced into the steam line 230a, and a small amount of steam is supplied to the makeup tank 260a through the vent line 250a. The vent line 250a may be insulated by an insulator 251a to prevent the heat loss of steam during a normal operation of the nuclear power plant 20a. Steam supplied to the makeup tank 260a or cooling fluid in the makeup tank 260a is transferred to the main steam line 27a1 again through the circulation line 290a. Due to the foregoing configuration, it may be possible to prevent the accumulation of non-condensable gas and maintain a water level of the makeup tank 260a by a circulation flow formed at a first and a second circulation loop.

The foregoing inflow structure 134f 134f', 134f'' (refer to FIGS. 13 and 14) may be also applicable to the passive residual heat removal system 200a. The inflow structure 134f 134f', 134f'' (refer to FIGS. 13 and 14) is provided within a portion shown as "B" on the drawing. The inflow structure described herein is referred to as a second inflow structure (not shown) to be distinguished from the foregoing inflow structure.

The second inflow structure (not shown) is extended from the vent line 250a and inserted into the steam line 230a to induce at least part of steam flowing through the steam line 230a to the vent line 250a. An inlet of an internal flow path of the second inflow structure (not shown) faces steam flowing through the steam line 230a. The detailed structure of the second inflow structure (not shown) is illustrated with reference to FIGS. 14 and 15.

Forming a flow of steam circulating through the second circulation flow path based on a principle in which a pressure gradually decreases as being further away from the steam generator 23a may be also applicable to the passive residual heat removal system 200a in FIG. 20. For example, on the contrary to the illustration of FIG. 20, the steam line 230a may be connected to the main steam line 27a1 at a position closer to the steam generator 23a than to the vent line 250a, and the vent line 250a may be connected to the main steam line 27a1 at a position farther from the steam generator 23a than the steam line 230a. Furthermore, a flow resistance region (not shown) may be formed between a connection portion of the steam line 230a and a connection portion of the vent line 250a in the main steam line 27a1.

Figure 21:
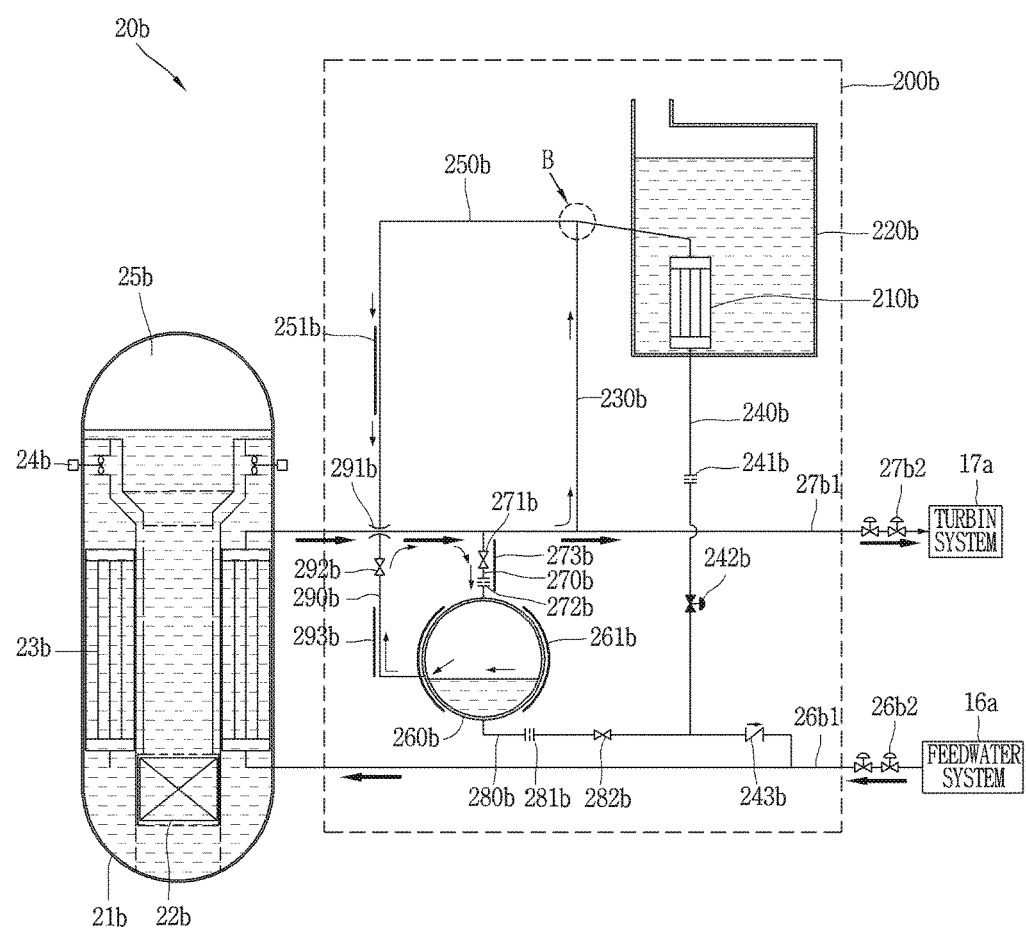
FIG. 21 is a conceptual view illustrating a modified example of the nuclear power plant including the passive residual heat removal system illustrated in FIG. 20.

FIG. 21 is a conceptual view illustrating a modified example of the nuclear power plant 20b including the passive residual heat removal system 200b illustrated in FIG. 20.

A first connection line 270b and a vent line 250b are formed as individual constituent elements.

The passive residual heat removal system 200b may further include a second pressure drop structure 252b configured to locally cause a decrease of pressure based on a principle in which the pressure relatively decreases according to a speed increase of fluid. Referring to FIG. 21, the second pressure drop structure 252b is provided along with a first pressure drop structure 291b.

The second pressure drop structure 252b is provided at an internal flow path of a connection portion of the vent line 250b and the main steam line 27b1 to form a flow of steam circulating through the second circulation flow path to cause a local pressure drop. The detailed structure of the second pressure drop structure 252b is illustrated with reference to FIGS. 2 and 3.

Figure 22:
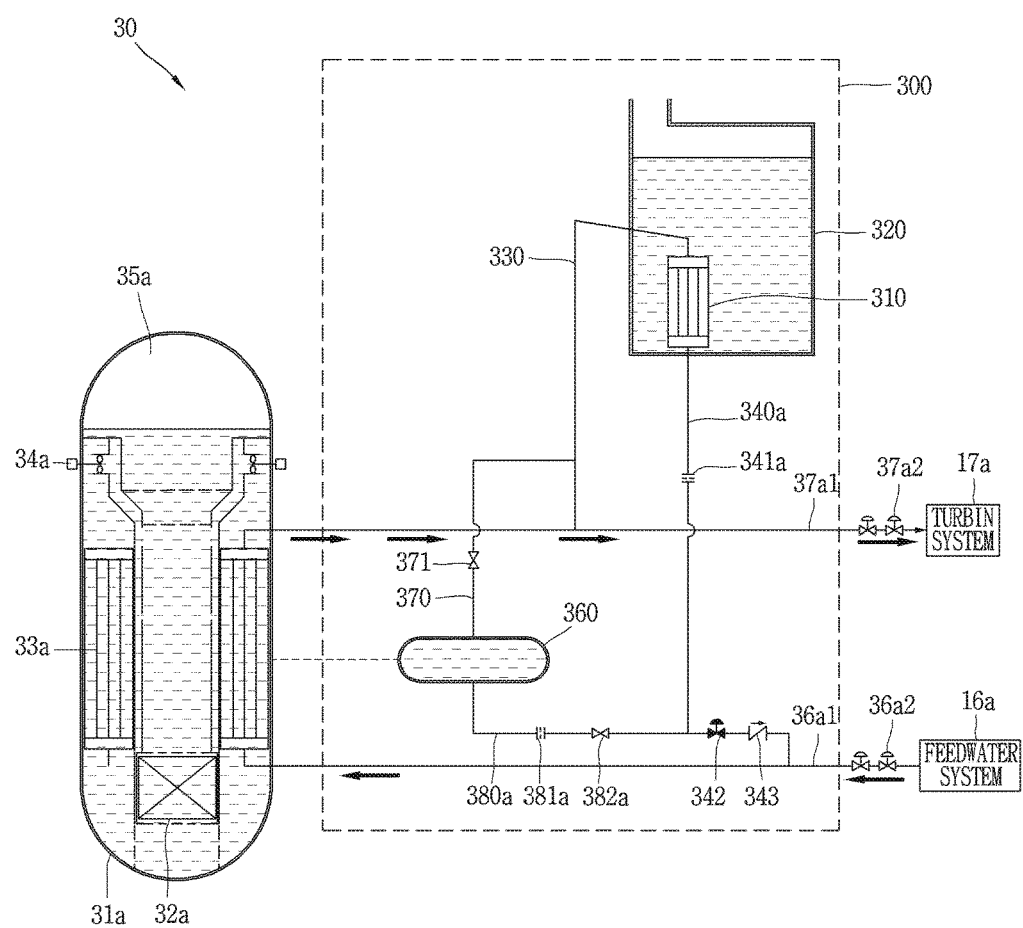
FIG. 22 is a still another conceptual view illustrating a passive residual heat removal system and a nuclear power plant including the same according to another embodiment of the present disclosure.

FIG. 22 is a still another conceptual view illustrating a passive residual heat removal system 300 and a nuclear power plant 30 including the same according to another embodiment of the present disclosure.

Referring to FIG. 22, a makeup tank 360 is formed in a rectangular shape both end portions of which are formed in a hemispherical shape. Furthermore, a water level of the makeup tank 360 is determined as a first water level.

The first water level corresponds to a level at which cooling fluid is fully filled in the makeup tank 360 to supply makeup cooling fluid when the water level of the steam generator 33a is less than the water level of the makeup tank 360 during an accident. The makeup tank 360 set to the first water level performs only a makeup function, and supplies makeup cooling fluid only when the water level of the steam generator 33a is less than that of the makeup tank 360 during an accident. The first water level may be applicable to a case where a flow of cooling fluid of the passive residual heat removal system 300 is insufficient in all conditions during an accident or a case of the nuclear power plant 30 having a characteristic capable of sufficiently performing the performance even though an amount of cooling fluid is somewhat large as a capacity of the condensation heat exchanger 310a is designed to be large enough.

When the water level of the makeup tank 360 is determined as a first water level, it may be possible to remove the circulation line (not shown) described in another drawing in the above.

The present disclosure illustrates only a case where a water-cooling condensation heat exchanger is applied thereto using an emergency cooling tank, but the present disclosure may be also applicable to a case where an air-cooling condensation heat exchanger is applied thereto by increasing the capacity of the condensation heat exchanger, and further applicable to a case where a water and air hybrid cooling condensation heat exchanger is applied thereto.

The present disclosure may maintain an optimal amount of cooling fluid of the passive residual heat removal system, and the passive residual heat removal system may exhibit an optimal performance for a long period of time. Furthermore, the present disclosure may prevent non-condensable gas from being accumulated in the passive residual heat removal system. As a result, the present disclosure may enhance accuracy on the performance prediction of the passive residual heat removal system. In addition, the present disclosure may optimize a facility of the passive residual heat removal system to enhance economic efficiency, and alleviate the supercooling phenomenon of the nuclear power plant during an accident through an optimal design, and provide the safety enhancement of the nuclear power plant through the accuracy enhancement of performance prediction.

The configurations and methods according to the above-described embodiments will not be applicable in a limited way to the foregoing passive residual heat removal system and a nuclear power plant including the same, and all or part of each embodiment may be selectively combined and configured to make various modifications thereto.

REFERENCE NUMERALS 10a, 10b, 10c, 10d, 10e, 10f, 10g, 10h, 10i, 10j, 20a, 20b, 30: Nuclear power plant 100a, 100b, 100c, 100d, 100e, 100f, 100g, 100h, 100i, 100j, 200a, 200b, 300: Passive residual heat removal system 110a, 110b, 110c, 110d, 110e, 110f, 110g, 110h, 110i, 110j, 210a, 210b, 300: Condensation heat exchanger 120a, 120b, 120c, 120d, 120e, 120f, 120g, 120h, 120i, 120j, 220a, 220b, 320: Emergency cooling tank 130a, 130b, 130c, 130d, 130e, 130f, 130g, 130h, 130i, 130j, 230a, 230b, 330: Steam line
140a, 140b, 140c, 140d, 140e, 140f, 140g, 140h, 140i, 140j, 240a, 240b, 340: Feedwater line
250a, 250b: Vent line
160a, 160b, 160c, 160d, 160e, 160f, 160g, 160h, 160i, 160j, 260a, 260b, 360: Makeup tank
170a, 170b, 170c, 170d, 170e, 170f, 170g, 170h, 170i, 170j, 270a, 270b, 370: First connection line
180a, 180b, 180c, 180d, 180e, 180f, 180g, 180h, 180i, 180j, 280a, 280b, 380: Second connection line
190a, 190b, 190c, 190d, 190e, 190f, 190g, 190h, 190i, 190j, 290a, 290b: Circulation line The present disclosure may be used in the nuclear power plant industry including a passive residual heat removal system.

What is claimed is:

1. A passive residual heat removal system for circulating cooling fluid to a steam generator through a main feedwater line connected to a lower inlet of the steam generator and a main steam line connected to an upper outlet of the steam generator to remove sensible heat in a nuclear reactor coolant system and residual heat in a nuclear reactor core during an accident, the passive residual heat removal system comprising:
a makeup facility configured to accommodate excess cooling fluid and supply makeup cooling fluid to maintain an amount of the cooling fluid within a preset range,
wherein the lower inlet is at a first vertical height, and the upper outlet is at a second vertical height higher than the first vertical height,
wherein the makeup facility comprises:
a makeup tank vertically located between the first vertical height and the second vertical height to passively accommodate the excess cooling fluid and supply the makeup cooling fluid according to a water level of the cooling fluid in the makeup tank;
a first connection line connected to the main steam line and the makeup tank for allowing cooling fluid to flow from the main steam line to the makeup tank; and
a second connection line connected to the makeup tank and the main feedwater line for supplying the main feedwater line with cooling fluid supplied from the makeup tank.

2. The passive residual heat removal system of claim 1, wherein an initial water level of the makeup tank is set to either one of a first through a third water level, and
the first water level corresponds to a level at which the cooling fluid is fully filled in the makeup tank to supply the makeup cooling fluid when the water level of the steam generator is lower than the water level of the makeup tank during an accident, and
the second water level corresponds to a level at which cooling fluid is depleted in the makeup tank to accommodate the excess cooling fluid and supply the accommodated cooling fluid as the makeup cooling fluid during an accident, and
the third water level corresponds to a level formed at a height between the first water level and the second water level to accommodate the excess cooling fluid and supply the cooling fluid using initially stored cooling fluid as the makeup cooling fluid.

3. The passive residual heat removal system of claim 1, wherein the first connection line is connected to the main steam line through a steam line of the passive residual heat removal system to receive steam or the cooling fluid from the steam line.

4. The passive residual heat removal system of claim 1, wherein the makeup facility further comprises a circulation line having one end connected to the main steam line and having the other end connected to the makeup tank.

5. The passive residual heat removal system of claim 4, wherein the first connection line is connected to the main steam line at a position closer to the steam generator than to the circulation line, and the circulation line is connected to the main steam line at a position farther from the steam generator than the first connection line.

6. The passive residual heat removal system of claim 4, wherein the makeup facility further comprises a first pressure drop structure configured to locally cause a decrease of pressure based on a principle in which a pressure relatively decreases according to a speed increase of fluid, and
the first pressure drop structure is provided at a connection portion of the circulation line and the main steam line.

7. The passive residual heat removal system of claim 4, wherein the makeup tank, the first connection line and the circulation line are insulated by an insulator to limit the energy loss of steam passing through the makeup tank, the first connection line and the circulation line during the normal operation of a nuclear power plant.

8. The passive residual heat removal system of claim 4, wherein the passive residual heat removal system comprises:
a condensation heat exchanger configured to discharge sensible heat in the nuclear reactor coolant system and residual heat in the nuclear reactor core received through the circulation of the cooling fluid to an outside;
a feedwater line connected to the condensation heat exchanger and the main feedwater line for supplying the cooling fluid from the condensation heat exchanger to the steam generator;
a steam line connected to the main steam line and the condensation heat exchanger for supplying cooling fluid discharged from the steam generator to the condensation heat exchanger; and
a vent line connected to the steam line and the main steam line or connected to the steam line and the makeup tank for preventing non-condensable gas from being accumulated in the makeup tank or the steam line by allowing the cooling fluid flowing from the steam line to be supplied to the main steam line or the makeup tank.

9. The passive residual heat removal system of claim 8, wherein the passive residual heat removal system further comprises an inflow structure configured to induce at least part of a flow of steam, and
the inflow structure comprises at least one of:
a first inflow structure extended from the first connection line and inserted into the main steam line to allow an inlet of an internal flow path to face steam flowing through the main steam line so as to induce at least part of steam flowing through the steam line to the first connection line; and
a second inflow structure extended from the vent line and inserted into the steam line to allow an inlet of an internal flow path to face steam flowing through the steam line so as to induce at least part of steam flowing through the steam line to the vent line.

10. The passive residual heat removal system of claim 8, wherein the steam line is connected to the main steam line at a position closer to the steam generator than to the vent line, and the vent line is connected to the main steam line at a position farther from the steam generator than the steam line.

11. The passive residual heat removal system of claim 8, wherein the passive residual heat removal system further comprises a second pressure drop structure configured to locally cause a decrease of pressure based on a principle in which the pressure relatively decreases according to a speed increase of fluid, and
the second pressure drop structure is provided at an internal flow path of a connection portion of the vent line and the main steam line to cause a local pressure drop.

12. The passive residual heat removal system of claim 8, wherein an isolation valve that is open by related signals during an accident is provided at the feedwater line to initiate the operation of the passive residual heat removal system, and
the isolation valve is provided in duplicate or in parallel or provided along with a check valve for preventing the backflow of feedwater from the main feedwater line, and
the second connection line is connected to the feedwater line at a position between the two isolation valves provided in duplicate or between the isolation valve and the check valve, and connected to the main feedwater line through the feedwater line.

13. The passive residual heat removal system of claim 8, wherein the feedwater line is connected to the makeup tank for supplying cooling fluid discharged from the condensation heat exchanger to the makeup tank, and the second connection line is connected to the main feedwater line for supplying cooling fluid received through the feedwater line to the steam generator, and the feedwater line is connected to the main feedwater line through the makeup tank and the second connection line.

14. The passive residual heat removal system of claim 8, wherein the makeup facility further comprises a flow resistance portion, and
the flow resistance portion comprises at least one of:
a first flow resistance portion provided at the first connection line to adjust a flow of cooling fluid introduced from the main steam line to the makeup tank;
a second flow resistance portion provided at the second connection line to adjust a flow of makeup cooling fluid supplied from the makeup tank to the main feedwater line; and
a third flow resistance portion provided at the feedwater line to adjust a flow of cooling fluid supplied from the condensation heat exchanger to the feedwater line.

15. A nuclear power plant, comprising:
a steam generator provided at a boundary between a primary system and a secondary system;
a main feedwater line connected to a lower inlet of the steam generator to supply feedwater from a feedwater system to the steam generator during a normal operation;
a main steam line connected to an upper outlet of the steam generator to supply steam from the steam generator to a turbine system during a normal operation;
a passive residual heat removal system configured to circulate cooling fluid to the steam generator through the main feedwater line and the main steam line to remove sensible heat in a nuclear reactor coolant system and residual heat in a nuclear reactor core during an accident; and
a makeup facility configured to accommodate excess cooling fluid and supply makeup cooling fluid to maintain an amount of the cooling fluid within a preset range,
wherein the lower inlet is at a first vertical height, and the upper outlet is at a second vertical height higher than the first vertical height,
wherein the makeup facility comprises:
a makeup tank vertically located between the first vertical height and the second vertical height to passively accommodate the excess cooling fluid and supply the makeup cooling fluid according to a water level of the cooling fluid in the makeup tank;
a first connection line connected to the main steam line and the makeup tank for allowing cooling fluid to flow from the main steam line to the makeup tank; and
a second connection line connected to the makeup tank and the main feedwater line for supplying the main feedwater line with cooling fluid supplied from the makeup tank.

\* \* \* \* \*